US010886643B2

(12) United States Patent
Oh

(10) Patent No.: US 10,886,643 B2
(45) Date of Patent: Jan. 5, 2021

(54) DISPLAY DEVICE

(71) Applicant: SAMSUNG DISPLAY CO., LTD., Yongin-si (KR)

(72) Inventor: Myongsoo Oh, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 101 days.

(21) Appl. No.: 16/214,611

(22) Filed: Dec. 10, 2018

(65) Prior Publication Data
US 2019/0245283 A1    Aug. 8, 2019

(30) Foreign Application Priority Data

Feb. 8, 2018    (KR) .................. 10-2018-0015407

(51) Int. Cl.
G02F 1/133       (2006.01)
H01R 12/52       (2011.01)
G06F 3/041       (2006.01)
G02F 1/1345      (2006.01)

(52) U.S. Cl.
CPC ....... *H01R 12/523* (2013.01); *G02F 1/13306* (2013.01); *G02F 1/13452* (2013.01); *G02F 1/13458* (2013.01); *G06F 3/041* (2013.01)

(58) Field of Classification Search
CPC ......... G02F 1/133385; G02F 1/133308; G02F 1/13452; H01L 23/538; H01L 25/18; H01L 27/12
USPC ................. 361/749–750, 760–761, 803; 174/250–258; 349/149–151
See application file for complete search history.

(56) References Cited

U.S. PATENT DOCUMENTS

| 8,675,372 | B2 | 3/2014 | Saimen | |
|---|---|---|---|---|
| 9,869,911 | B2 | 1/2018 | Park et al. | |
| 10,237,968 | B2 * | 3/2019 | Yoshii | H04N 5/14 |
| 2008/0119061 | A1 | 5/2008 | Hwang et al. | |
| 2011/0122356 | A1 * | 5/2011 | Saimen | H05K 1/0269 349/149 |
| 2011/0134621 | A1 * | 6/2011 | Saimen | G02F 1/13452 361/803 |
| 2017/0196133 | A1 * | 7/2017 | Yamaguchi | H01L 24/75 |
| 2018/0031892 | A1 * | 2/2018 | Masui | H05K 1/111 |

(Continued)

FOREIGN PATENT DOCUMENTS

| KR | 100881183 B1 | 1/2009 |
|---|---|---|
| KR | 1020110008433 A | 1/2011 |
| KR | 1020120105378 A | 9/2012 |

(Continued)

*Primary Examiner* — Tuan T Dinh
(74) *Attorney, Agent, or Firm* — Cantor Colburn LLP

(57) ABSTRACT

A display device includes a substrate including a display area and a non-display area, a first pad terminal and a second pad terminal disposed in the non-display area of the substrate, the first pad terminal arranged along a first column and the second pad terminal arranged along a second column, a first connection unit connected to the first pad terminal, a first driving integrated circuit ("IC") connected to the first connection unit, a second connection unit connected to the second pad terminal and overlapping the first connection unit, and a second driving IC connected to the second connection unit. A maximum width of the second connection unit in a row direction is larger than a maximum width of the first connection unit in the row direction.

26 Claims, 11 Drawing Sheets

(56) References Cited

U.S. PATENT DOCUMENTS

2018/0031902 A1* 2/2018 Uchiyama ............ G02F 1/13452
2018/0224692 A1* 8/2018 Miyashita ............ G02F 1/13452

FOREIGN PATENT DOCUMENTS

| KR | 101359658 B1 | 1/2014 |
| KR | 101681390 B1 | 11/2016 |
| KR | 1020170059060 A | 5/2017 |

* cited by examiner

DISPLAY DEVICE

This application claims priority to Korean Patent Application No. 10-2018-0015407, filed on Feb. 8, 2018, and all the benefits accruing therefrom under 35 U.S.C. § 119, the content of which in its entirety is herein incorporated by reference.

1. FIELD

Exemplary embodiments of the invention relate to a display device, and more particularly, to a display device capable of substantially minimizing a defect rate and reducing manufacturing costs.

2. DISCUSSION OF RELATED ART

Display devices may be classified into liquid crystal display ("LCD") devices, organic light emitting diode ("OLED") display devices, plasma display panel ("PDP") devices, electrophoretic display devices, or the like based on a light emitting scheme thereof.

Such display devices include a display panel, a driving integrated circuit ("IC"), a printed circuit board ("PCB"), or the like. The display panel may be electrically connected to the driving IC, the PCB, or the like through a pad terminal.

SUMMARY

Exemplary embodiments of the invention may be directed to a display device capable of substantially minimizing a defect rate and reducing manufacturing costs.

According to an exemplary embodiment, a display device includes a substrate including a display area and a non-display area, a first pad terminal and a second pad terminal disposed in the non-display area of the substrate, the first pad terminal arranged along a first column and the second pad terminal arranged along a second column, a first connection unit connected to the first pad terminal, a first driving integrated circuit ("IC") connected to the first connection unit, a second connection unit connected to the second pad terminal and overlapping the first connection unit, and a second driving IC connected to the second connection unit. A maximum width of the second connection unit in a row direction is larger than a maximum width of the first connection unit in the row direction.

In an exemplary embodiment, the display device may further include a first pad alignment mark disposed in the non-display area of the substrate and close to the first pad terminal, and a second pad alignment mark disposed in the non-display area of the substrate and close to the second pad terminal.

In an exemplary embodiment, the second pad alignment mark may not overlap the first connection unit in a column direction.

In an exemplary embodiment, the first pad alignment mark may include two first pad alignment marks spaced apart from each other with the first pad terminal therebetween, and the second pad alignment mark may include two second pad alignment marks spaced apart from each other with the second pad terminal therebetween.

In an exemplary embodiment, an interval between the two second pad alignment marks may be larger than an interval between the two first pad alignment marks.

In an exemplary embodiment, the display device may further include a first connection alignment mark disposed at the first connection unit and overlapping the first pad alignment mark, and a second connection alignment mark disposed at the second connection unit and overlapping the second pad alignment mark.

In an exemplary embodiment, the second connection unit may overlap the first pad terminal and the first pad alignment mark, and the first connection unit may not overlap the second pad terminal and the second pad alignment mark.

In an exemplary embodiment, at least a part of the first connection unit may be disposed between the substrate and the second connection unit.

In an exemplary embodiment, the display device may further include a PCB connected to the first connection unit and the second connection unit.

In an exemplary embodiment, the first connection unit may include an output lead line connected to the first pad terminal and the first driving IC, and an input lead line connected to the first driving IC and the PCB.

In an exemplary embodiment, the second connection unit may include an output lead line connected to the second pad terminal and the second driving IC, and an input lead line connected to the second driving IC and the PCB.

In an exemplary embodiment, the output lead line of the first connection unit may intersect the output lead line of the second connection unit, and the input lead line of the first connection unit may not intersect the input lead line of the second connection unit.

In an exemplary embodiment, one side of the first connection unit may overlap the substrate and does not intersect an edge of the substrate, another side of the first connection unit that opposes the one side of the first connection unit may overlap the PCB and does not intersect an edge of the PCB, and a length of the one side of the first connection unit may be larger than a length of the another side of the first connection unit.

In an exemplary embodiment, one side of the second connection unit may overlap the substrate and does not intersect an edge of the substrate, another side of the second connection unit that opposes the one side of the second connection unit may overlap the PCB and does not intersect an edge of the PCB, and a length of the one side of the second connection unit may be larger than a length of the another side of the second connection unit.

In an exemplary embodiment, the length of the one side of the second connection unit may be larger than the length of the one side of the first connection unit.

According to another exemplary embodiment, a display device includes a substrate including a display area and a non-display area, a first pad terminal and a second pad terminal disposed in the non-display area of the substrate, the first pad terminal arranged along a first column and the second pad terminal arranged along a second column, a first connection unit connected to the first pad terminal, a driving IC disposed at the first connection unit, and a second connection unit connected to the second pad terminal and the first connection unit and overlapping the first connection unit. A maximum width of the second connection unit in a row direction is larger than a maximum width of the first connection unit in the row direction.

In an exemplary embodiment, the display device may further include a first pad alignment mark disposed in the non-display area of the substrate and disposed close to the first pad terminal, and a second pad alignment mark disposed in the non-display area of the substrate and disposed close to the second pad terminal.

In an exemplary embodiment, the second pad alignment mark may not overlap the first connection unit in a column direction.

In an exemplary embodiment, the first pad alignment mark may include two first pad alignment marks spaced apart from each other with the first pad terminal therebetween, and the second pad alignment mark may include two second pad alignment marks spaced apart from each other with the second pad terminal therebetween.

In an exemplary embodiment, an interval between the two second pad alignment marks may be larger than an interval between the two first pad alignment marks.

In an exemplary embodiment, the display device may further include a first connection alignment mark disposed at the first connection unit and overlapping the first pad alignment mark, and a second connection alignment mark disposed at the second connection unit and overlapping the second pad alignment mark.

In an exemplary embodiment, the second connection unit may overlap the first pad terminal and the first pad alignment mark, and the first connection unit may not overlap the second pad terminal and the second pad alignment mark.

In an exemplary embodiment, at least a part of the first connection unit may be disposed between the substrate and the second connection unit.

In an exemplary embodiment, the display device may further include a PCB connected to the first connection unit.

In an exemplary embodiment, the first connection unit may include a first output lead line connected to the first pad terminal and the driving IC, a second output lead connected to the driving IC and the second connection, and an input lead line connected to the driving IC and the PCB.

In an exemplary embodiment, the second connection unit may include a lead line connected to the second pad terminal and one of the driving IC and the second output lead line.

The foregoing is illustrative only and is not intended to be in any way limiting. In addition to the illustrative exemplary embodiments, exemplary embodiments and features described above, further exemplary embodiments, exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, in which.

DETAILED DESCRIPTION

Figure 1:
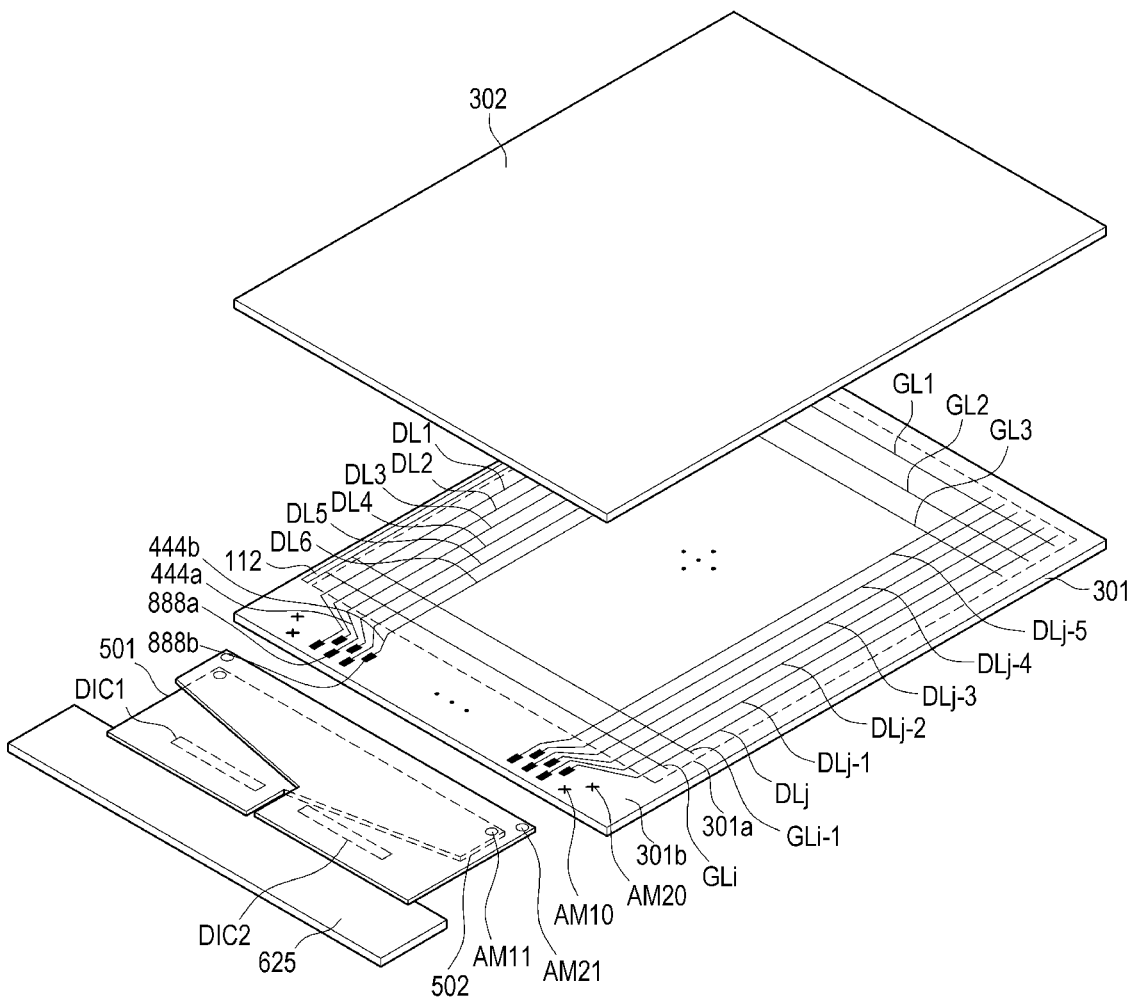
FIG. 1 is an exploded perspective view illustrating an exemplary embodiment of a display device according to the invention.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," or the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the specification.

Some of the parts which are not associated with the description may not be provided in order to specifically describe exemplary embodiments of the invention and like reference numerals refer to like elements throughout the specification.

Hereinafter, an exemplary embodiment of the invention will be described with reference to FIGS. 1 to 9.

Figure 2:
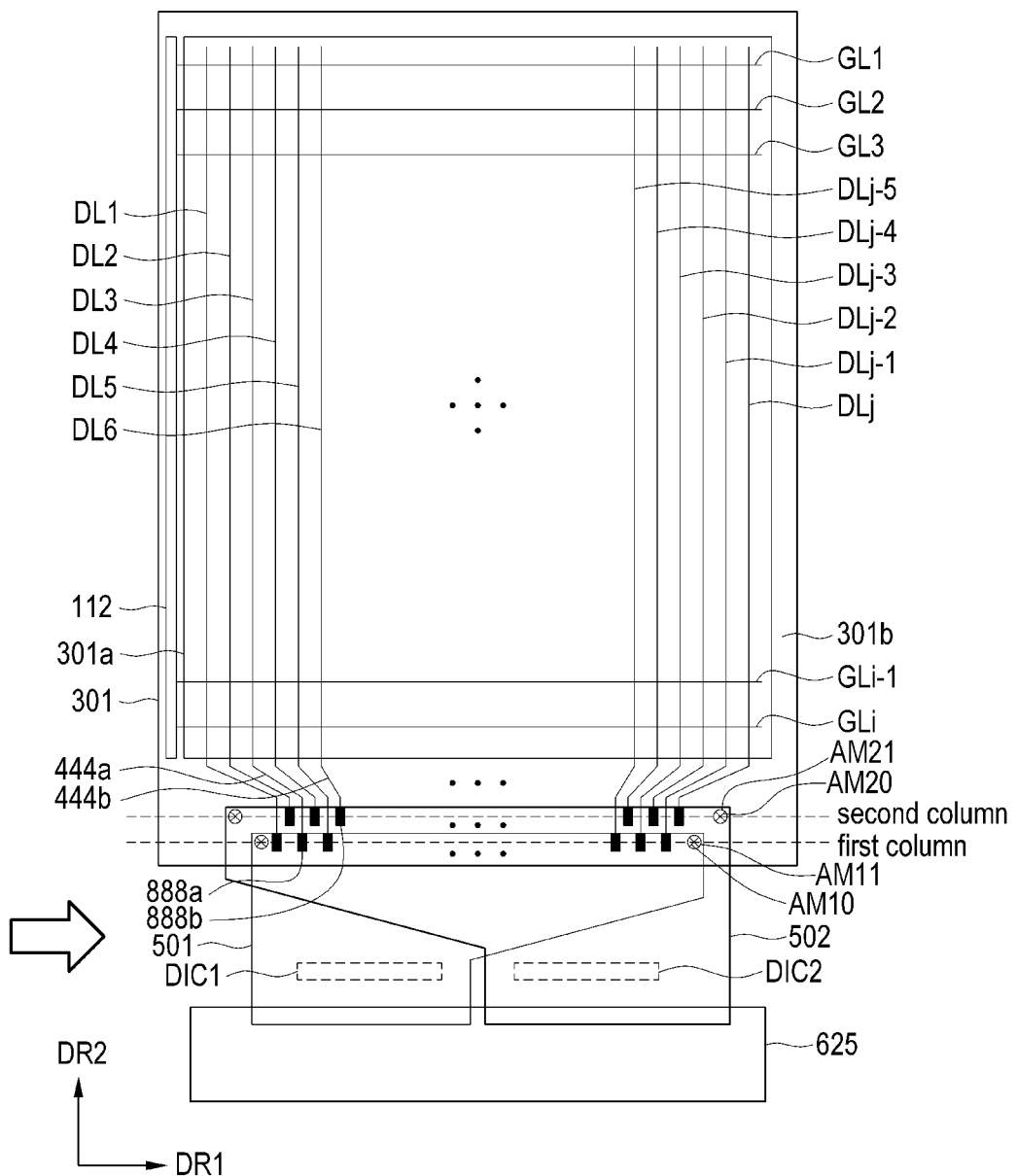
FIG. 2 is a plan view illustrating a first substrate, a first data driving integrated circuit ("IC"), a second data driving IC, a first connection unit, a second connection unit, and a printed circuit board ("PCB") of FIG. 1 in a state that they are coupled to each other.

FIG. 1 is an exploded perspective view illustrating a display device according to an exemplary embodiment of the invention, and FIG. 2 is a plan view illustrating a first substrate 301, a first driving integrated circuit ("IC") DIC1, a second driving IC DIC2, a first connection unit 501, a second connection unit 502, and a printed circuit board ("PCB") 625 of FIG. 1 in a state that they are coupled to each other. Hereinafter, the first and second driving ICs DIC1 and DIC2 according to an exemplary embodiment of the invention will be described on the premise that they are data driving ICs, respectively. However, the scope of the invention is not limited thereto, and the first and second driving ICs DIC1 and DIC2 according to an exemplary embodiment of the invention may be gate driving ICs, respectively, for example.

As illustrated in FIGS. 1 and 2, the display device according to an exemplary embodiment of the invention includes the first substrate 301, a second substrate 302, a gate driver 112, the first data driving IC DIC1, the second data driving IC DIC2, the first connection unit 501, the second connection unit 502, a plurality of gate lines GL1 to GLi, a plurality of data lines DL1 to DLj, where i and j are natural numbers, and the PCB 625. Although not illustrated, a liquid crystal layer or an organic light emitting layer may be further disposed between the first substrate 301 and the second substrate 302. In another exemplary embodiment, the second substrate 302 may be omitted.

The first substrate 301 has a display area 301a and a non-display area 301b. A plurality of pixels is arranged in the display area 301a. Although not illustrated, the pixel may include a switching element, a pixel electrode, and a common electrode. The switching element includes a gate electrode connected to the gate line, a source electrode connected to the data line, and a drain electrode connected to the pixel electrode. The switching element is also referred to as a thin film transistor ("TFT").

The common electrode may be disposed on the second substrate 302, and the liquid crystal layer or the organic light emitting layer may be disposed between the common electrode and the pixel electrode. In an exemplary embodiment, the common electrode may be disposed on the first substrate 301.

In addition, although not illustrated, the pixel may further include a color filter and a light shielding layer, and the color filter and the light shielding layer may be disposed on the first substrate 301 or the second substrate 302. The light shielding layer may be commonly referred to as a black matrix.

The plurality of gate lines GL1 to GLi are disposed in the display area 301a of the first substrate 301. Each of the gate lines GL1 to GLi extends to the non-display area 301b and is connected to the gate driver 112.

The gate driver 112 is disposed in the non-display area 301b of the first substrate 301. The gate driver 112 drives the gate lines GL1 to GLi. The gate driver 112 generates gate signals and sequentially applies the gate signals to the gate lines GL1 to GLi.

The plurality of data lines DL1 to DLj are disposed in the display area 301a of the first substrate 301. The data lines DL1 to DLj intersect the gate lines GL1 to GLi. Each of the data lines DL1 to DLj extends to the non-display area 301b and is connected to one of the first connection unit 501 and the second connection unit 502. In an exemplary embodiment, between the data lines DL1 to DLj, odd-numbered data lines DL1, DL3, DL5, . . . , DLj-5, DLj-3, and DLj-1 may be connected to the first connection unit 501, and even-numbered data lines DL2, DL4, DL6, . . . , DLj-4, DLj-2, and DLj may be connected to the second connection unit 502, for example.

Each of the data lines DL1 to DLj may be connected to the first connection unit 501 or the second connection unit 502 through one of a plurality of link lines 444a or 444b. In an exemplary embodiment, the odd-numbered data lines DL1, DL3, DL5, . . . , DLj-5, DLj-3, and DLj-1 may be connected to the first connection unit 501 through odd-numbered link lines 444a, respectively, and the even-numbered data lines DL2, DL4, DL6, . . . , DLj-4, DLj-2, and DLj may be connected to the second connection unit 502 through even-numbered link lines 444b, respectively, for example. The number of the link lines 444a and 444b is equal to the number of the data lines DL1 to DLj. The link lines 444a and 444b may also be referred to as fan-out lines.

Referring to FIG. 2, as a more detailed example of the data lines DL1 to DLj, the link lines 444a and 444b, the first connection unit 501, and the second connection unit 502, the third data line DL3 may be connected to the first connection unit 501 through the odd-numbered link line 444a, and the sixth data line DL6 may be connected to the second connection unit 502 through the even-numbered link line 444b.

Portions of the link lines 444a and 444b that are connected to the first connection unit 501 or the second connection unit 502 are to be defined as pad terminals 888a and 888b of the corresponding link lines 444a and 444b, respectively. Each of the pad terminals 888a and 888b may be disposed at an end portion of each corresponding one of the link lines 444a and 444b, and may have a width greater than a width of a remaining portion of each of the link lines 444a and 444b.

In detail, the pad terminals 888a and 888b include first pad terminals 888a and second pad terminals 888b. The first pad terminals 888a according to an exemplary embodiment of the invention may be pad terminals of the odd-numbered link lines 444a and may be connected to the odd-numbered data lines DL1, DL3, DL5, ..., DLj-5, DLj-3, and DLj-1. In addition, the second pad terminals 888b may be pad terminals of the even-numbered link lines 444b and may be connected to the even-numbered data lines DL2, DL4, DL6, ..., DLj-4, DLj-2, and DLj. In an exemplary embodiment, as illustrated in FIG. 2, the first pad terminal 888a of the odd-numbered link line 444a is connected to the third data line DL3, and the second pad terminal 888b of the even-numbered link line 444b is connected to the sixth data line DL6, for example.

As illustrated in FIGS. 1 and 2, the first pad terminals 888a and the second pad terminals 888b are arranged along different columns. In an exemplary embodiment, the first pad terminals 888a are arranged in a line along a first column that is located farther away from the display area 301a than the second pad terminals 888b is from the display area 301a, and the second pad terminals 888b are arranged in a line along a second column that is located closer to the display area 301a than the first pad terminals 888a is to the display area 301a, for example.

In other words, the first pad terminals 888a are disposed in a portion of the non-display area 301b farther away from the display area 301a than a portion of the non-display area 301b in which the second pad terminals 888b are disposed is from the display area 301a, and are arranged therein parallelly along a row direction DR1 which is a length direction of the gate line. In addition, the second pad terminals 888b are located in a portion of the non-display area 301b closer to the display area 301a than the portion of the non-display area 301b in which the first pad terminals 888a are disposed is to the display area 301a, and are arranged therein parallelly along the row direction DR1.

Each second pad terminal 888b is located between two adjacent odd-numbered link lines 444a. In an exemplary embodiment, a rightmost one of the second pad terminals 888b, that is, the last second pad terminal 888b, is located between a rightmost one of the odd-numbered link lines 444a and a right edge of the first substrate 301.

According to an exemplary embodiment, the first pad terminals 888a in the first column may not be the odd-numbered pad terminal. In an exemplary embodiment, the first pad terminals 888a in the first column may include at least one odd-numbered pad terminal and at least one even-numbered pad terminal, for example. In addition, the second pad terminals 888b in the second column may not be an even-numbered pad terminal. In an exemplary embodiment, the second pad terminals 888b in the second column may include at least one odd-numbered pad terminal and at least one even-numbered pad terminal that are different from the first pad terminal 888a, for example. However, at least one of the second pad terminals 888b is disposed between the link lines 444a that are respectively connected to adjacent two first pad terminals 888a.

The display device according to an exemplary embodiment of the invention includes a first pad alignment mark AM10 and a second pad alignment mark AM20 used in an alignment process. In an exemplary embodiment, the display device may include two first pad alignment marks AM10 that are located on the first substrate 301 in the non-display area 301b and are spaced apart from each other with the first pad terminals 888a therebetween, for example. Similarly, the display device may include two second pad alignment marks AM20 that are located on the first substrate 301 in the non-display area 301b and are spaced apart from each other with the second pad terminals 888b therebetween. However, embodiments are not limited thereto, and the respective numbers of the first and second pad alignment marks AM10 and AM20 may be variously set.

As illustrated in FIGS. 1 and 2, the first pad alignment mark AM10 and the second pad alignment mark AM20 are located in different columns. In an exemplary embodiment, the first pad alignment mark AM10 is located in a first column that is located farther away from the display area 301a than the second pad alignment mark AM20 is from the display area 301a, and the second pad alignment mark AM20 is located in a second column that is located closer to the display area 301a than the first pad alignment mark AM10 is to the display area 301a, for example.

In other words, the first pad alignment mark AM10 and the first pad terminals 888a are arranged in a line along the first column in a portion of the non-display area 301b farther away from the display area 301a than a portion of the non-display area 301b in which the second pad alignment mark AM20 and the second pad terminals 888b are disposed is from the display area 301a, and the first pad alignment mark AM10 is disposed outwardly of the first pad terminals 888a in the row direction DR1. The second pad alignment mark AM20 and the second pad terminals 888b are arranged in a line along the second column in a portion of the non-display area 301b closer to the display area 301a than the portion of the non-display area 301b in which the first pad alignment mark AM10 and the first pad terminals 888a are disposed is to the display area 301a, and the second pad alignment mark AM20 is disposed outwardly of the second pad terminals 888b in the row direction DR1.

According to an exemplary embodiment of the invention, an interval between the two second pad alignment marks AM20 is larger than an interval between the two first pad alignment marks AM10. Accordingly, a more precise alignment process may be performed, and defects due to misalignment between the first substrate 301 and the first and second connection units 501 and 502 may be substantially minimized, which will be described in detail below.

The first connection unit 501 is connected to the first substrate 301 and the PCB 625. In an exemplary embodiment, an input portion of the first connection unit 501 may be electrically connected to the PCB 625, and an output portion of the first connection unit 501 may be electrically connected to the non-display area 301b of the first substrate 301, for example. In an exemplary embodiment, the first connection unit 501 may be electrically connected to each of the first substrate 301 and the PCB 625 by an anisotropic conductive film, for example.

The output portion of the first connection unit 501 is connected to the first pad terminals 888a. In other words, the output portion of the first connection unit 501 is connected to the first pad terminals 888a located along the first column.

The first connection unit 501 includes a first connection alignment mark AM11 corresponding to the first pad alignment mark AM10 on the first substrate 301. In an exemplary embodiment, the first connection unit 501 may include two first connection alignment marks AM11 overlapping the two first pad alignment marks AM10 arranged along the first column, respectively, for example. In particular, the two first connection alignment marks AM11 may be disposed close to two edges of the first connection unit 501, respectively, in the area where the first connection unit 501 has a maximum width in the row direction DR1. However, embodiments are not limited thereto, and the number of the first connection alignment marks AM11 may be variously set.

Although it is illustrated that each of the first pad alignment mark AM10 has an x-letter shape and each of the first connection alignment mark AM11 has a circular shape, embodiments are not limited thereto. In other exemplary embodiments, the plurality of alignment marks AM10 and AM11 may have various shapes such as a line, a polygon, and an irregular shape.

In the alignment process, a separate controller may align the output portion of the first connection unit 501 and the first pad terminals 888a on the first substrate 301 by the first pad alignment mark AM10 and the first connection alignment mark AM11.

The second connection unit 502 is connected to the first substrate 301 and the PCB 625. In an exemplary embodiment, an input portion of the second connection unit 502 may be electrically connected to the PCB 625, and an output portion of the second connection unit 502 may be electrically connected to the non-display area 301b of the first substrate 301, for example. In an exemplary embodiment, the second connection unit 502 may be electrically connected to each of the first substrate 301 and the PCB 625 by an anisotropic conductive film, for example.

The output portion of the second connection unit 502 is connected to the second pad terminals 888b. In other words, the output portion of the second connection unit 502 is connected to the second pad terminals 888b located along the second column.

The second connection unit 502 includes a second connection alignment mark AM21 corresponding to the second pad alignment mark AM20 on the first substrate 301. In an exemplary embodiment, the second connection unit 502 may include two second connection alignment marks AM21 overlapping the two second pad alignment marks AM20 arranged along the second column, respectively, for example. In particular, the two second connection alignment marks AM21 may be disposed close to two edges of the second connection unit 502, respectively, in the area where the second connection unit 502 has a maximum width in the row direction DR1. However, embodiments are not limited thereto, and the number of the second connection alignment marks AM21 may be variously set.

Although it is illustrated that each of the second pad alignment mark AM20 has an x-letter shape and each of the second connection alignment mark AM21 has a circular shape, embodiments are not limited thereto. The plurality of alignment marks AM20 and AM21 may have various shapes such as a line, a polygon, and an irregular shape.

In the alignment process, a separate controller may align the output portion of the second connection unit 502 and the second pad terminals 888b on the first substrate 301 by the second pad alignment mark AM20 and the second connection alignment mark AM21.

At least one of the first pad terminals 888a connected to the first connection unit 501 is connected to the link line 444a that passes between the second pad terminals 888b connected to the second connection unit 502. In an exemplary embodiment, as illustrated in FIG. 2, one first pad terminal 888a connected to the third data line DL3 is connected to the first connection unit 501, and the link line 444a connected to the one first pad terminals 888a passes between two adjacent second pad terminals 888b, for example. In such an exemplary embodiment, the two second pad terminals 888b are connected to the second connection unit 502. In other words, at least one of the odd-numbered data lines DL1, DL3, DL5, . . . , DLj-5, DLj-3, and DLj-1 connected to the first connection unit 501 is disposed between two adjacent even-numbered data lines connected to the second connection unit 502.

At least one of the second pad terminals 888b connected to the second connection unit 502 is disposed between the link lines 444a that are connected to the first connection unit 501. In an exemplary embodiment, as illustrated in FIG. 2, one second pad terminal 888b connected to the second data line DL2 is connected to the second connection unit 502, and the one second pad terminal 888b is disposed between two adjacent odd-numbered link lines 444a, for example. The two adjacent odd-numbered link lines 444a are connected to the first connection unit 501 through respective first pad terminals 888a. In other words, at least one of the even-numbered data lines DL2, DL4, DL6, . . . , DLj-4, DLj-2, and DLj connected to the second connection unit 502 may be disposed between two odd-numbered data lines connected to the first connection unit 501.

The first connection unit 501 overlaps the second connection unit 502. In particular, as illustrated in FIGS. 1 and 2, a portion of the first connection unit 501 may be disposed between the first substrate 301 and the second connection unit 502. In an exemplary embodiment, in an area where the first connection unit 501 overlaps the second connection unit 502, a portion of the first connection unit 501 may be disposed between the first substrate 301 and the second connection unit 502, for example. In addition, the second connection unit 502 overlaps the first pad terminals 888a and the first pad alignment mark AM10, but the first connection unit 501 does not overlap the second pad terminals 888b and the second pad alignment mark AM20.

In an exemplary embodiment, at least one of the first connection unit 501 and the second connection unit 502 described above may be a tape carrier, for example. In an exemplary embodiment, at least one of the first connection unit 501 and the second connection unit 502 may be a flexible printed circuit ("FPC"), for example.

The first data driving IC DIC1 is connected to the first connection unit 501. To this end, the first data driving IC DIC1 may be disposed (e.g., mounted) in the first connection unit 501. In an exemplary embodiment, the first data driving IC DIC1 may be electrically connected to the first connection unit 501 by surface mounting technology, for example.

The first data driving IC DIC1 is connected to the first pad terminals 888a through the first connection unit 501. In an exemplary embodiment, output terminals of the first data driving IC DIC1 are connected to the first pad terminals 888a, respectively, through the output portion of the first connection unit 501, for example. Accordingly, the output terminals of the first data driving IC DIC1 are connected to the odd-numbered data lines DL1, DL3, DL5, . . . , DLj-5, DLj-3, and DLj-1 through the odd-numbered link lines 444a, respectively. The first data driving IC DIC1 provides image data signals to the odd-numbered data lines DL1, DL3, DL5, . . . , DLj-5, DLj-3, and DLj-1.

The second data driving IC DIC2 is connected to the second connection unit 502. To this end, the second data driving IC DIC2 may be disposed (e.g., mounted) in the second connection unit 502. In an exemplary embodiment, the second data driving IC DIC2 may be electrically connected to the second connection unit 502 by surface mounting technology, for example.

The second data driving IC DIC2 is connected to the second pad terminals 888b through the second connection unit 502. In an exemplary embodiment, output terminals of the second data driving IC DIC2 are connected to the second pad terminals 888b, respectively, through the output portion of the second connection unit 502, for example. Accordingly, the output terminals of the second data driving IC DIC2 are connected to the even-numbered data lines DL2, DL4, DL6, . . . , DLj-4, DLj-2, and DLj through the even-numbered link lines 444b, respectively. The second data driving IC DIC2 provides image data signals to the even-numbered data lines DL2, DL4, DL6, . . . , DLj-4, DLj-2, and DLj.

Figure 3:
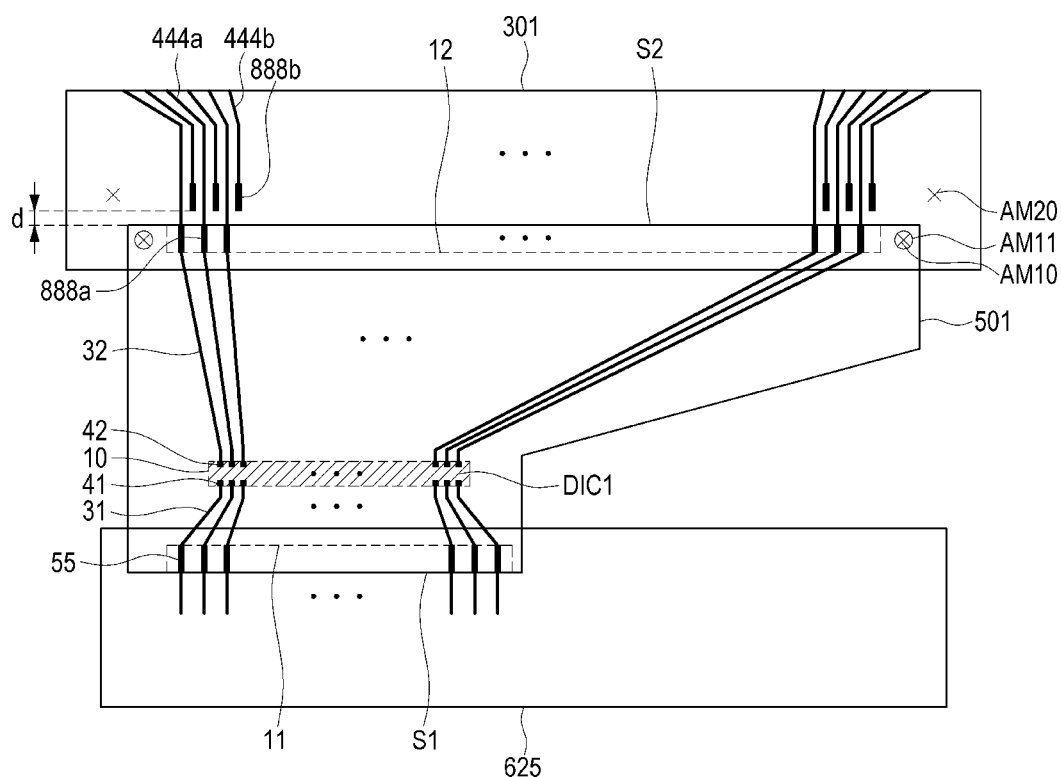
FIG. 3 is a plan view illustrating the first substrate, the first connection unit, and the PCB of FIG. 2.
Figure 4:
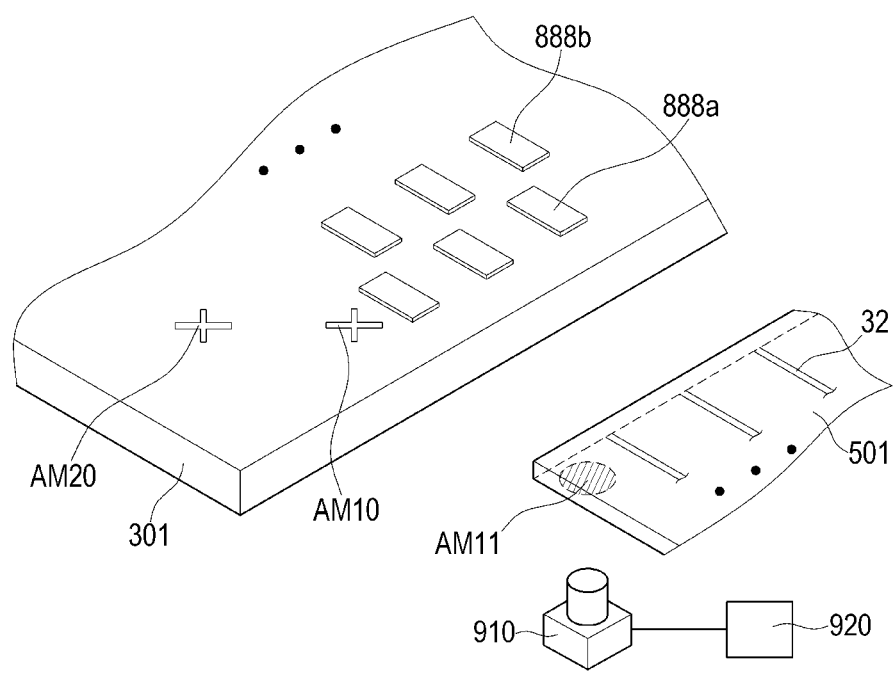
FIG. 4 is a partial perspective view for explaining an alignment process of the first substrate and the first connection unit.

FIG. 3 is a plan view illustrating the first substrate 301, the first connection unit 501, and the PCB 625 of FIG. 2, and FIG. 4 is a partial perspective view for explaining an alignment process of the first substrate 301 and the first connection unit 501.

As illustrated in FIG. 3, the first connection unit 501 includes a mounting portion 10, an input portion 11, an output portion 12, a plurality of input lead lines 31, a plurality of output lead lines 32, and a first connection alignment mark AM11.

The first data driving IC DIC1 is disposed (e.g., mounted) in the mounting portion 10. The mounting portion 10 is disposed between the input portion 11 and the output portion 12.

The input portion 11 is connected to the PCB 625, and the output portion 12 is connected to the first substrate 301. The input portion 11 is disposed close to one side S1 (hereinafter, "a first side") of the first connection unit 501, and the output portion 12 is disposed close to another side S2 (hereinafter, "a second side") of the first connection unit 501. The second side S2 is disposed opposite to the first side S1. In such an exemplary embodiment, a length of the second side S2 of the first connection unit 501 according to an exemplary embodiment of the invention is larger than a length of the first side S1, as illustrated in FIG. 3.

The first side S1 of the first connection unit 501 overlaps the PCB 625. In such an exemplary embodiment, the first side S1 does not intersect an edge of the PCB 625. The second side S2 of the first connection unit 501 overlaps the first substrate 301. In such an exemplary embodiment, the second side S2 does not intersect an edge of the first substrate 301.

The input lead lines 31 are connected to input terminals 41 of the first data driving IC DIC1, respectively. In addition, the input lead lines 31 are connected to pad terminals 55 of the PCB 625, respectively. In an exemplary embodiment, one end portion of the input lead line 31 is connected to the input terminal 41 of the first data driving IC DIC1 and another end portion of the input lead line 31 is connected to the pad terminal 55 of the PCB 625, for example.

One end portion of each input lead line 31 is exposed from the first connection unit 501 through the mounting portion 10, and another end portion of each input lead line 31 is exposed from the first connection unit 501 through the input portion 11.

The output lead lines 32 are connected to output terminals 42 of the first data driving IC DIC1, respectively. In addition, the output lead lines 32 are connected to the first pad terminals 888a of the first substrate 301, respectively. In an exemplary embodiment, one end portion of the output lead line 32 is connected to the output terminal 42 of the first data driving IC DIC1, and another end portion of the output lead line 32 is connected to the first pad terminal 888a of the first substrate 301, for example.

One end portion of each output lead line 32 is exposed from the first connection unit 501 through the mounting portion 10, and another end portion of each output lead line 32 is exposed from the first connection unit 501 through the output portion 12.

In an exemplary embodiment, as illustrated in FIG. 3, a distance d between the first pad terminal 888a and the second pad terminal 888b may be equal to or greater than about 200 micrometers (μm), for example. In other words, a distance between the first column and the second column may be equal to or greater than about 200 μm, for example. When such a distance is maintained, detachment of the second connection unit 502 may be substantially prevented.

The first connection unit 501 according to an exemplary embodiment of the invention is disposed on the first substrate 301 such that the first connection alignment mark AM11 of the first connection unit 501 and the first pad alignment mark AM10 on the first substrate 301 overlap each other. That is, the two first connection alignment marks AM11 are disposed overlapping the two first pad alignment marks AM10, respectively, that are spaced apart from each other with the output portion 12 interposed therebetween. The position of each of the first pad alignment mark AM10 and the first connection alignment mark AM11 may be set in advance such that the first pad terminals 888a on the first substrate 301 and the output portion 12 of the first connection unit 501 may be aligned with and electrically connected to each other.

In the alignment process, the user may monitor the first pad alignment mark AM10 and the first connection alignment mark AM11. Based on the monitoring data, a separate controller may transfer at least one of the first substrate 301 and the first connection unit 501 so that the first pad alignment mark AM10 and the first connection alignment mark AM11 may overlap each other.

In an exemplary embodiment, as illustrated in FIG. 4, at least one camera 910 may be used during the alignment process, for example. The camera 910 may be disposed below the first substrate 301 and the first connection unit 501 to photograph the first pad alignment mark AM10 and the first connection alignment mark AM11. In such an exemplary embodiment, one camera 910 may photograph a plurality of alignment marks at a time, and a plurality of cameras 910 may respectively photograph corresponding ones of the plurality of alignment marks.

The camera 910 may generate image data and transmit the image data to a controller 920. The controller 920 may transfer at least one of the first substrate 301 and the first connection unit 501 so that the first pad alignment mark AM10 and the first connection alignment mark AM11 overlap each other by the image data received from the camera 910. When the first substrate 301 and the first connection unit 501 are aligned so that the first pad alignment mark AM10 and the first connection alignment mark AM11 overlap each other, a bonding process for attaching the first substrate 301 and the first connection unit 501 may be performed. The first substrate 301 and the first connection unit 501 may be electrically connected to each other by an anisotropic conductive film. Through such a process, the first pad terminals 888a on the first substrate 301 and the output portion 12 of the first connection unit 501 may be aligned with and electrically connected to each other.

Figure 5:
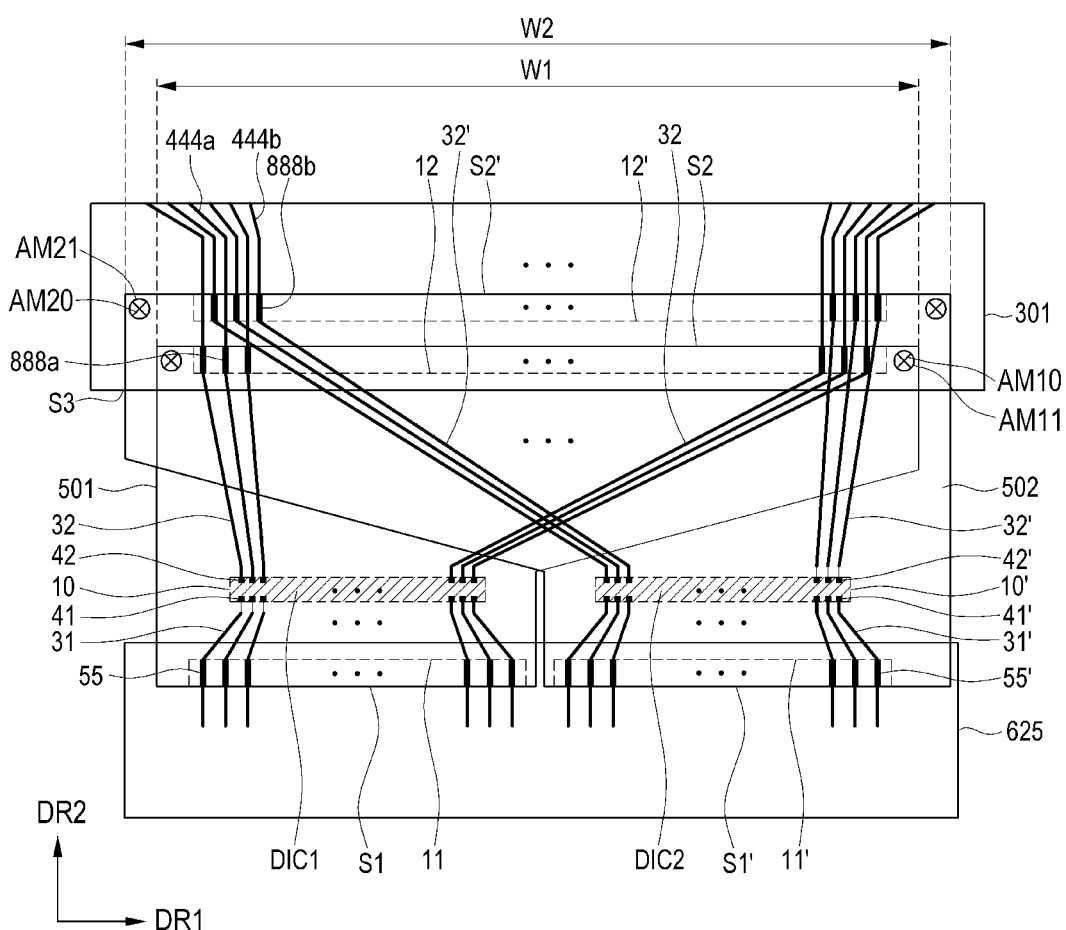
FIG. 5 is a plan view illustrating the first substrate, the first connection unit, the second connection unit, and the PCB of FIG. 2.
Figure 6:
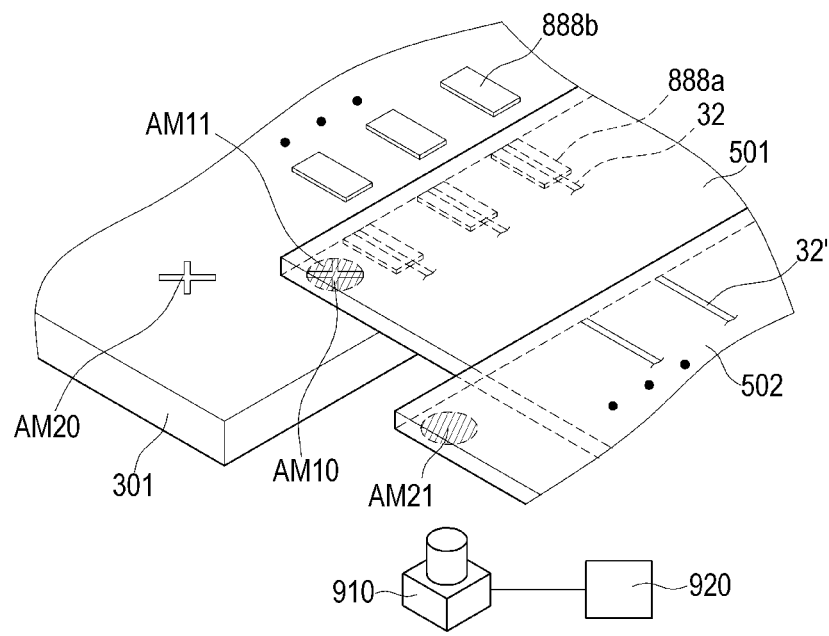
FIG. 6 is a partial perspective view for explaining an alignment process of the first substrate and the second connection unit.

FIG. 5 is a plan view illustrating the first substrate 301, the first connection unit 501, the second connection unit 502, and the PCB 625 of FIG. 2, and FIG. 6 is a partial perspective view for explaining an alignment process of the first substrate 301 and the second connection unit 502.

As illustrated in FIG. 5, the second connection unit 502 includes a mounting portion 10', an input portion 11', an output portion 12', a plurality of input lead lines 31', a plurality of output lead lines 32', and a second connection alignment mark AM21.

The second data driving IC DIC2 is disposed (e.g., mounted) in the mounting portion 10'. The mounting portion 10' is disposed between the input portion 11' and the output portion 12'.

The input portion 11' is connected to the PCB 625, and the output portion 12' is connected to the first substrate 301. The input portion 11' is disposed close to one side S1' (hereinafter, "a first side") of the second connection unit 502, and the output portion 12' is disposed close to another side S2' (hereinafter, "a second side") of the second connection unit 502. The second side S2' is disposed opposite to the first side S1'. In such an exemplary embodiment, a length of the second side S2' of the second connection unit 502 according to an exemplary embodiment of the invention may be larger than a length of the first side S1'.

The first side S1' of the second connection unit 502 overlaps the PCB 625. In such an exemplary embodiment, the first side S1' does not intersect an edge of the PCB 625. The second side S2' of the second connection unit 502 overlaps the first substrate 301. In such an exemplary embodiment, the second side S2' does not intersect an edge of the first substrate 301.

The input lead lines 31' are connected to input terminals 41' of the second data driving IC DIC2, respectively. In addition, the input lead lines 31' are connected to pad terminals 55' of the PCB 625, respectively. In an exemplary embodiment, one end portion of the input lead line 31' is connected to the input terminal 41' of the second data driving IC DIC2, and another end portion of the input lead line 31' is connected to the pad terminal 55' of the PCB 625, for example.

One end portion of each input lead line 31' is exposed from the second connection unit 502 through the mounting portion 10', and another end portion of each input lead line 31' is exposed from the second connection unit 502 through the input portion 11'.

The output lead lines 32' are connected to output terminals 42' of the second data driving IC DIC2, respectively. In addition, the output lead lines 32' are connected to the second pad terminals 888*b* of the first substrate 301, respectively. In an exemplary embodiment, one end portion of the output lead line 32' is connected to the output terminal 42' of the second data driving IC DIC2, and another end portion of the output lead line 32' is connected to the second pad terminal 888*b* of the first substrate 301, for example.

One end portion of each output lead line 32' is exposed from the second connection unit 502 through the mounting portion 10', and another end portion of each output lead line 32' is exposed from the second connection unit 502 through the output portion 12'.

At least one of the output lead lines 32 of the first connection unit 501 intersects at least one of the output lead lines 32' of the second connection unit 502. The input lead lines 31 of the first connection unit 501 do not intersect the input lead lines 31' of the second connection unit 502. In addition, the output portion 12 of the first connection unit 501 is disposed in a plan view between the second side S2' of the second connection unit 502 and a side S3 (hereinafter, "a third side") of the first substrate 301. The third side S3 is one of the sides of the first substrate 301 that overlaps the first connection unit 501 and the second connection unit 502.

In an exemplary embodiment, as illustrated in FIG. 5, the second connection unit 502 according to an exemplary embodiment of the invention has a maximum width larger than that of the first connection unit 501. More specifically, when the maximum width in the row direction DR1 of the first connection unit 501 is defined as a first width W1 and the maximum width in the row direction DR1 of the second connection unit 502 is defined as a second width W2, the second width W2 is larger than the first width W1. In such an exemplary embodiment, the first width W1 may correspond to the length of the second side S2 of the first connection unit 501, and the second width W2 may correspond to the length of the second side S2' of the second connection unit 502. In other words, the length of the second side S2' of the second connection unit 502 that is close to the output portion 12' of the second connection unit 502 is larger than the length of the second side S2 of the first connection unit 501 that is close to the output portion 12 of the first connection unit 501.

In addition, as described above, the interval between the two second pad alignment marks AM20 is larger than the interval between the two first pad alignment marks AM10. Similarly, the interval between the two second connection alignment marks AM21 is larger than the interval between the two first connection alignment marks AM11. In particular, the two second pad alignment marks AM20 and the two second connection alignment marks AM21 do not overlap the first connection unit 501 in a column direction DR2 in a plan view. Accordingly, a more precise alignment process may be performed, and defects due to misalignment between the first substrate 301 and the first and second connection units 501 and 502 may be substantially minimized, which will be described in detail below.

The second connection unit 502 according to an exemplary embodiment of the invention is disposed on the first substrate 301 such that the second connection alignment mark AM21 of the second connection unit 502 and the second pad alignment mark AM20 on the first substrate 301 overlap each other. That is, the two second connection alignment marks AM21 are disposed overlapping the two second pad alignment marks AM20, respectively, which are spaced apart from each other with the output portion 12' interposed therebetween. The position of each of the second pad alignment mark AM20 and the second connection alignment mark AM21 may be set in advance such that the second pad terminals 888*b* on the first substrate 301 and the output portion 12' of the second connection unit 502 may be aligned with and electrically connected to each other.

In the alignment process, the user may monitor the second pad alignment mark AM20 and the second connection alignment mark AM21. Based on the monitoring data, a separate controller may transfer at least one of the first substrate 301 and the second connection unit 502 so that the second pad alignment mark AM20 and the second connection alignment mark AM21 may overlap each other.

In an exemplary embodiment, as illustrated in FIG. 6, at least one camera 910 may be used during the alignment process, for example. The camera 910 may be disposed below the first substrate 301 and the second connection unit 502 to photograph the second pad alignment mark AM20 and the second connection alignment mark AM21. In such an exemplary embodiment, one camera 910 may photograph a plurality of alignment marks at a time, and the plurality of cameras 910 may respectively photograph corresponding ones of the plurality of alignment marks.

The camera 910 may generate image data and transmit the image data to a controller 920. The controller 920 may transfer at least one of the first substrate 301 and the second connection unit 502 so that the second pad alignment mark AM20 and the second connection alignment mark AM21 overlap each other by the image data received from the camera 910. When the first substrate 301 and the second connection unit 502 are aligned so that the second pad alignment mark AM20 and the second connection alignment mark AM21 overlap each other, a bonding process for attaching the first substrate 301 and the second connection unit 502 may be performed. The first substrate 301 and the second connection unit 502 may be electrically connected to each other by an anisotropic conductive film. Through such a process, the second pad terminals 888b on the first substrate 301 and the output portion 12' of the second connection unit 502 may be aligned with and electrically connected to each other.

Figure 7:
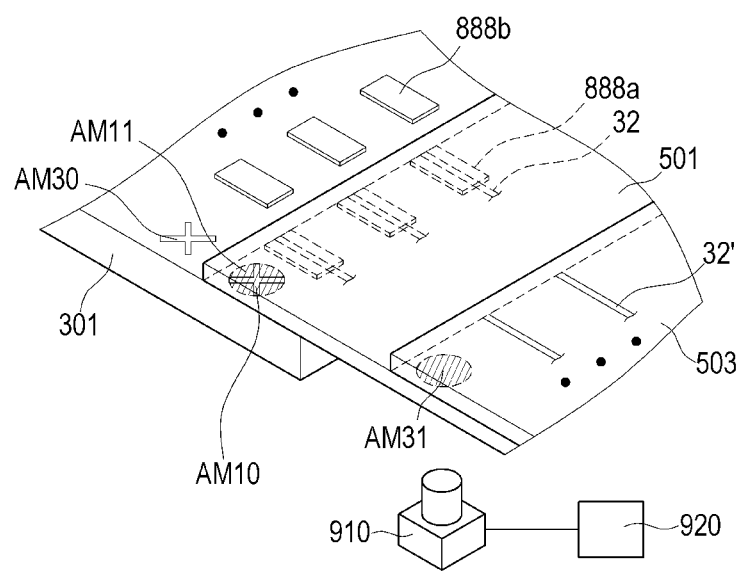
FIG. 7 is a partial perspective view corresponding to FIG. 6 for comparison with an exemplary embodiment of the invention.

FIG. 7 is a partial perspective view corresponding to FIG. 6 for comparison with an exemplary embodiment of the invention. That is, FIG. 7 is a partial perspective view for explaining an alignment process of a first substrate 301 and a second connection unit 503.

The second connection unit 503 illustrated in FIG. 7 is assumed to have a width substantially the same as that of a first connection unit 501. That is, in an exemplary embodiment of the invention, it is assumed that an interval between two first pad alignment marks AM10 is substantially equal to an interval between two second pad alignment marks AM30, and an interval between two first connection alignment marks AM11 is substantially equal to an interval between two second connection alignment marks AM31.

As described above, a camera 910 may be disposed below the first substrate 301 and the second connection unit 503, and may photograph the second pad alignment mark AM30 and the second connection alignment mark AM31. In such an exemplary embodiment, when the width of the second connection unit 503 is substantially equal to the width of the first connection unit 501, as illustrated in FIG. 7, the second connection alignment mark AM31 located at the second connection unit 503 may overlap the first connection unit 501 attached to the first substrate 301 in the aligning process.

That is, the first connection unit 501 is located between the second connection alignment mark AM31 to be monitored and the camera 910. Accordingly, the camera 910 may have difficulty in shooting the second connection alignment mark AM31, located at the second connection unit 503, which is blocked by the first connection unit 501.

As illustrated in FIG. 6, the second connection unit 502 according to an exemplary embodiment of the invention has a maximum width larger than that of the first connection unit 501, and the interval between the two second connection alignment marks AM21 is larger than the interval between the two first connection alignment marks AM11. In particular, the two second pad alignment mark AM20 and the two second connection alignment marks AM21 do not overlap the first connection unit 501 in the column direction DR2 in a plan view.

That is, since the first connection unit 501 is not located between the second connection alignment mark AM21 to be monitored and the camera 910, more precise alignment process may be performed. Accordingly, defects due to misalignment between the first substrate 301 and the first and second connection units 501 and 502 may be substantially minimized.

Figure 8:
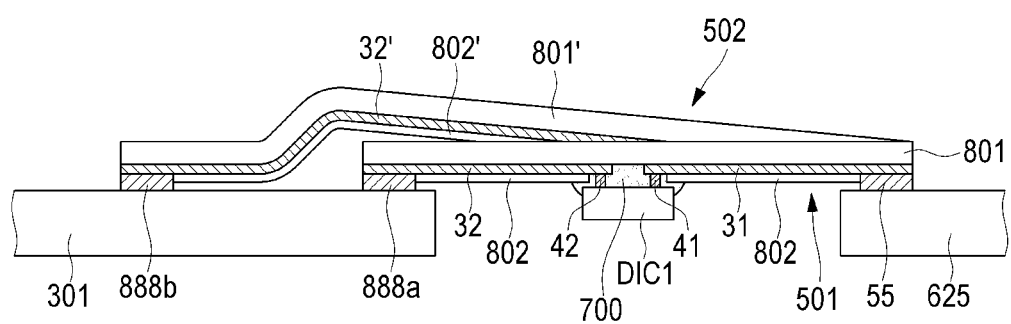
FIG. 8 is a cross-sectional view illustrating the display device of FIG. 2 when viewed in the direction of the arrow.
Figure 9:
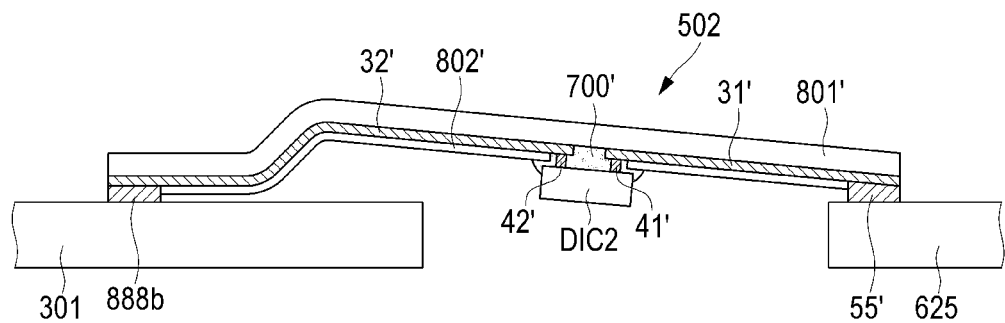
FIG. 9 is a cross-sectional view of FIG. 8 in which the first connection unit and the first data driving IC are removed.

FIG. 8 is a cross-sectional view illustrating the display device of FIG. 2 when viewed in the direction of the arrow, and FIG. 9 is a cross-sectional view of FIG. 8 in which the first connection unit 501 and the first data driving IC DIC1 are removed. In an exemplary embodiment, the data lines and the link lines 444a and 444b connected to the pad terminals 888a and 888b are not illustrated in FIGS. 8 and 9 for the convenience of explanation.

As illustrated in FIG. 8, the first connection unit 501 includes a base layer 801, the input lead line 31, the output lead line 32, and a cover layer 802.

In an exemplary embodiment, the base layer 801 may include polyimide, for example.

In an exemplary embodiment, the cover layer 802 may be a solder resist, for example.

The input lead line 31 and the output lead line 32 are located between the base layer 801 and the cover layer 802.

One end portion of the input lead line 31 is connected to the input terminal 41 of the first data driving IC DIC1 through the mounting portion 10 (refer to FIG. 5) of the cover layer 802, and another end portion of the input lead line 31 is connected to the pad terminal 55 of the PCB 625 through the input portion 11 (refer to FIG. 5) of the cover layer 802.

One end portion of the output lead line 32 is connected to the output terminal 42 of the first data driving IC DIC1 through the mounting portion 10 (refer to FIG. 5) of the cover layer 802, and another end portion of the output lead line 32 is connected to the first pad terminal 888a of the first substrate 301 through the output portion 12 (refer to FIG. 5) of the cover layer 802.

The first data driving IC DIC1 may be attached to the first connection unit 501 through an adhesive member 700.

Referring to FIG. 9, the second connection unit 502 includes a base layer 801', the input lead line 31', the output lead line 32', and a cover layer 802'.

The input lead line 31' and the output lead line 32' are disposed between the base layer 801' and the cover layer 802'.

In an exemplary embodiment, the base layer 801' may include polyimide, for example.

In an exemplary embodiment, the cover layer 802' may be a solder resist, for example.

One end portion of the input lead line 31' is connected to the input terminal 41' of the second data driving IC DIC2 through the mounting portion 10' (refer to FIG. 5) of the cover layer 802', and another end portion of the input lead line 31' is connected to the pad terminal 55' of the PCB 625 through the input portion 11' (refer to FIG. 5) of the cover layer 802'.

One end portion of the output lead line 32' is connected to the output terminal 42' of the second data driving IC DIC2 through the mounting portion 10' (refer to FIG. 5) of the cover layer 802', and another end portion of the output lead line 32' is connected to the second pad terminal 888b of the first substrate 301 through the output portion 12' (refer to FIG. 5) of the cover layer 802'.

The second data driving IC DIC2 may be attached to the second connection unit 502 through an adhesive member 700'.

In an exemplary embodiment, the first connection unit 501 and the second connection unit 502 may be attached to the first substrate 301 at a time by a single bonding process. In an exemplary embodiment, although not illustrated, an anisotropic conductive film is disposed on the pad terminals 888a and 888b on the first substrate 301, for example. This anisotropic conductive film contacts all pad terminals including the first pad terminals 888a and the second pad terminals 888b.

The first connection unit 501 is then placed on the anisotropic conductive film so as to overlap the first pad terminals 888a of the first substrate 301, and then the second connection unit 502 is placed on the anisotropic conductive film so as to overlap the second pad terminals 888b of the first substrate 301. In such an exemplary embodiment, a part of the second connection unit 502 is located on the first connection unit 501.

Next, the first connection unit 501 and the second connection unit 502 are substantially simultaneously pressed. The first connection unit 501 and the second connection unit 502 may be bonded to the first substrate 301 at a time by the pressing process.

As such, according to an exemplary embodiment of the invention, the first connection unit 501 is connected to the first pad terminals 888a of the first substrate 301, and the second connection unit 502 is connected to the second pad terminals 888b. That is, the first connection unit 501 and the second connection unit 502 are a single-layer type connection unit, each selectively connected to pad terminals of only one column.

In an exemplary embodiment, a conventional multi-layer type connection unit is connected to all pad terminals of the substrate. That is, one connection unit is connected to the first pad terminals and the second pad terminals.

The conventional multi-layer type connection units have a higher unit price than the single-layer type connection units. That is, one multi-layer type connection unit has a higher price than two single-layer type connection units. In addition, the multi-layer type connection units have higher density lead lines than the single-layer type connection units, and thus are more susceptible to defects such as lead line cracks.

As such, since the display device according to an exemplary embodiment of the invention has a connection structure in which the single-layer type connection units 501 and 502 are superimposed, the manufacturing cost of the display device may be reduced, and the crack defect rate of the connection unit may be remarkably reduced.

Hereinafter, another exemplary embodiment of the invention will be described with reference to FIGS. 10 to 14. The description of the same configurations as those of an exemplary embodiment of the invention will be omitted for the convenience of explanation.

Figure 10:
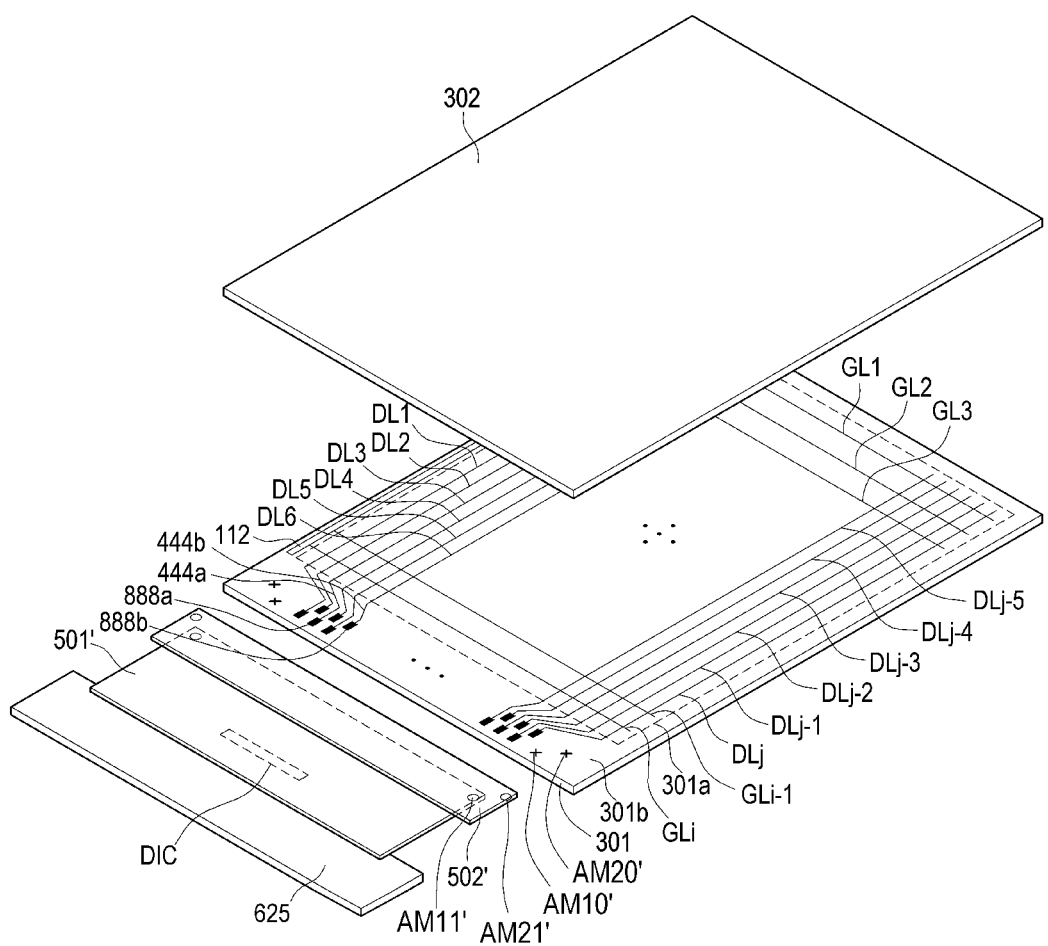
FIG. 10 is an exploded perspective view illustrating another exemplary embodiment of a display device according to the invention.
Figure 11:
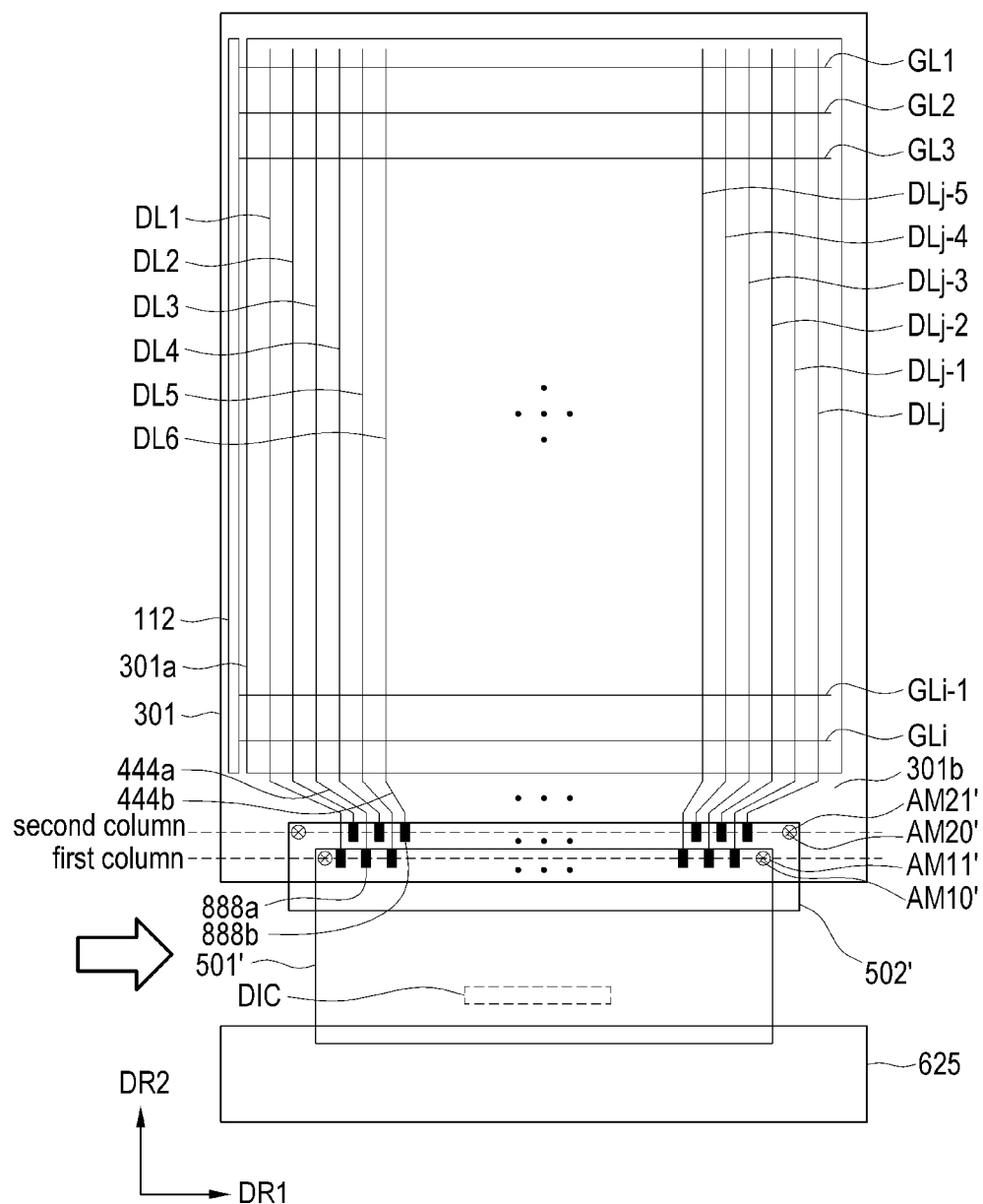
FIG. 11 is a plan view illustrating a first substrate, a data driving IC, a first connection unit, a second connection unit, and a PCB of FIG. 10 in a state that they are coupled to each other.

FIG. 10 is an exploded perspective view illustrating a display device according to another exemplary embodiment of the invention, and FIG. 11 is a plan view illustrating a first substrate 301, a data driving IC DIC, a first connection unit 501', a second connection unit 502', and a PCB 625 of FIG. 10 in a state that they are coupled to each other.

As illustrated in FIGS. 10 and 11, the display device according to another exemplary embodiment of the invention includes the first substrate 301, a second substrate 302, a gate driver 112, the data driving IC DIC, the first connection unit 501', the second connection unit 502', a plurality of gate lines GL1 to GLi, a plurality of data lines DL1 to DLj, and the PCB 625.

Detailed descriptions of the first substrate 301, the second substrate 302, the gate driver 112, the plurality of gate lines GL1 to GLi, and the plurality of data lines DL1 to DLj illustrated in FIG. 10 may refer to the above descriptions of the first substrate 301, the second substrate 302, the gate driver 112, the plurality of gate lines GL1 to GLi, and the plurality of data lines DL1 to DLj of FIG. 1.

Each of the data lines DL1 to DLj may be connected to the first connection unit 501' or the second connection unit 502' through one of a plurality of link lines 444a and 444b. In an exemplary embodiment, odd-numbered data lines DL1, DL3, DL5, ..., DLj-5, DLj-3, and DLj-1 may be connected to the first connection unit 501' through odd-numbered link lines 444a, respectively, and even-numbered data lines DL2, DL4, DL6, ..., DLj-4, DLj-2, and DLj may be connected to the second connection unit 502' through even-numbered link lines 444b, respectively. The number of the link lines 444a and 444b is equal to the number of the data lines DL1 to DLj, for example.

Portions of the link lines 444a and 444b that are connected to the first connection unit 501' or the second connection unit 502' are to be defined as pad terminals 888a and 888b of the corresponding link lines 444a and 444b. In specific, the pad terminal 888a and 888b include first pad terminals 888a and second pad terminals 888b. The first pad terminals 888a according to the embodiment of the invention may be pad terminals of the odd-numbered link lines 444a and may be connected to the odd-numbered data lines DL1, DL3, DL5, ..., DLj-5, DLj-3, and DLj-1. In addition, the second pad terminals 888b may be pad terminals of the even-numbered link lines 444b and may be connected to the even-numbered data lines DL2, DL4, DL6, ..., DLj-4, DLj-2, and DLj.

Detailed descriptions of the link lines 444a and 444b and the pad terminals 888a and 888b illustrated in FIGS. 10 and 11 may refer to the above descriptions of the link lines 444a and 444b and the pad terminals 888a and 888b of FIGS. 1 and 2.

The display device according to the embodiment of the invention includes a first pad alignment mark AM10' and a second pad alignment mark AM20' used in an alignment process. In an exemplary embodiment, the display device may include two first pad alignment marks AM10' that are located on the first substrate 301 in the non-display area 301b and are spaced apart from each other with the first pad terminals 888a therebetween, for example. Similarly, the display device may include two second pad alignment marks AM20' that are located on the first substrate 301 in the non-display area 301b and are spaced apart from each other with the second pad terminals 888b therebetween. However, embodiments are not limited thereto, and the respective numbers of the first and second pad alignment marks AM10' and AM20' may be variously set.

As illustrated in FIGS. 10 and 11, the first pad alignment mark AM10' and the second pad alignment mark AM20' are located in different columns. In an exemplary embodiment, the first pad alignment mark AM10' is located in a first column that is located farther away from the display area 301a than the second pad alignment mark AM20' is from the display area 301a, and the second pad alignment mark AM20' is located in a second column that is located closer to the display area 301a than the first pad alignment mark AM10' is to the display area 301a, for example.

In other words, the first pad alignment mark AM10' and the first pad terminals 888a are arranged in a line along the first column in a portion of the non-display area 301b farther away from the display area 301a than a portion of the non-display area 301b in which the second pad alignment mark AM20' and the second pad terminals 888b are disposed is from the display area 301a, and the first pad alignment mark AM10' is disposed outwardly of the first pad terminals 888a in the row direction DR1. The second pad alignment mark AM20' and the second pad terminals 888b are arranged in a line along the second column in a portion of the non-display area 301b closer to the display area 301a than a portion of the non-display area 301b in which the first pad alignment mark AM10' and the first pad terminals 888a are disposed is to the display area 301a, and the second pad alignment mark AM20' is disposed outwardly of the second pad terminals 888b in the row direction DR1.

According to the embodiment of the invention, an interval between the two second pad alignment marks AM20' is larger than an interval between the two first pad alignment marks AM10'. Accordingly, a more precise alignment process may be performed, and defects due to misalignment between the first substrate 301 and the first and second connection units 501' and 502' may be substantially minimized, which will be described in detail below.

The first connection unit 501' is connected to the first substrate 301 and the PCB 625. In an exemplary embodiment, an input portion of the first connection unit 501' may be electrically connected to the PCB 625, and an output portion of the first connection unit 501' may be electrically connected to the non-display area 301b of the first substrate 301, for example. In an exemplary embodiment, the first connection unit 501' may be electrically connected to each of the first substrate 301 and the PCB 625 by an anisotropic conductive film.

The output portion of the first connection unit 501' is connected to the first pad terminals 888a. In other words, the output portion of the first connection unit 501' is connected to the first pad terminals 888a located along the first column.

The first connection unit 501' includes a first connection alignment mark AM11' corresponding to the first pad alignment mark AM10' on the first substrate 301. In an exemplary embodiment, the first connection unit 501' may include two first connection alignment marks AM11' overlapping the two first pad alignment marks AM10', respectively, which are arranged along the first column, for example. However, embodiments are not limited thereto, and the number of the first connection alignment marks AM11' may be variously set.

In the alignment process, a separate controller may align the output portion of the first connection unit 501' and the first pad terminals 888a on the first substrate 301 by the first pad alignment mark AM10' and the first connection alignment mark AM11'.

The second connection unit 502' is connected to the first connection unit 501' and the first substrate 301. In an exemplary embodiment, an input portion of the second connection unit 502' may be electrically connected to the first connection unit 501', and an output portion of the second connection unit 502' may be electrically connected to the non-display area 301b of the first substrate 301, for example. In an exemplary embodiment, the second connection unit 502' may be electrically connected to the first connection unit 501' and the first substrate 301 by an anisotropic conductive film, for example.

The output portion of the second connection unit 502' is connected to the second pad terminals 888b. In other words, the output portion of the second connection unit 502' is connected to the second pad terminals 888b located along the second column.

The second connection unit 502' includes a second connection alignment mark AM21' corresponding to the second pad alignment mark AM20' on the first substrate 301. In an exemplary embodiment, the second connection unit 502' may include two second connection alignment marks AM21' overlapping the two second pad alignment marks AM20', respectively, which are arranged along the second column, for example. However, embodiments are not limited thereto, and the number of the second connection alignment marks AM21' may be variously set.

In the alignment process, a separate controller may align the output portion of the second connection unit 502' and the second pad terminals 888b on the first substrate 301 by the second pad alignment mark AM20' and the second connection alignment mark AM21'.

At least one of the first pad terminals 888a connected to the first connection unit 501' is connected to the link line 444a that passes between the second pad terminals 888b connected to the second connection unit 502'. In an exemplary embodiment, as illustrated in FIG. 11, one first pad terminal 888a connected to the third data line DL3 is connected to the first connection unit 501', and the link line 444a connected to the one first pad terminal 888a passes between two adjacent second pad terminals 888b, for example. In such an exemplary embodiment, the two second pad terminals 888b are connected to the second connection unit 502'. In other words, at least one of the odd-numbered data lines DL1, DL3, DL5, . . . , DLj-5, DLj-3, and DLj-1 connected to the first connection unit 501' is disposed between two adjacent even-numbered data lines connected to the second connection unit 502'.

At least one of the second pad terminals 888b connected to the second connection unit 502' is disposed between the link lines 444a connected to the first connection unit 501'. In an exemplary embodiment, as illustrated in FIG. 11, one second pad terminal 888b connected to the second data line DL2 is connected to the second connection unit 502', and the one second pad terminal 888b is disposed between two adjacent odd-numbered link lines 444a, for example. The two adjacent odd-numbered link lines 444a are connected to the first connection unit 501' through respective first pad terminals 888a. In other words, at least one of the even-numbered data lines DL2, DL4, DL6, . . . , DLj-4, DLj-2, and DLj connected to the second connection unit 502' may be disposed between two odd-numbered data lines connected to the first connection unit 501'.

The first connection unit 501' overlaps the second connection unit 502'. In particular, as illustrated in FIGS. 10 and 11, a portion of the first connection unit 501' may be disposed between the first substrate 301 and the second connection unit 502'. In an exemplary embodiment, in an area where the first connection unit 501' overlaps the second connection unit 502', a portion of the first connection unit 501' may be disposed between the first substrate 301 and the second connection unit 502', for example. In addition, the second connection unit 502' overlaps the first pad terminals 888a and the first pad alignment mark AM10', but the first connection unit 501' does not overlap the second pad terminals 888b and the second pad alignment mark AM20'.

In an exemplary embodiment, at least one of the first connection unit 501' and the second connection unit 502' described above may be a tape carrier, for example. In addition, at least one of the first connection unit 501' and the second connection unit 502' may be an FPC, for example.

The data driving IC DIC is connected to the first connection unit 501'. To this end, the data driving IC DIC may be disposed (e.g., mounted) in the first connection unit 501'. In an exemplary embodiment, the data driving IC DIC may be electrically connected to the first connection unit 501' by surface mounting technology, for example.

The data driving IC DIC is connected to the first pad terminals 888a through the first connection unit 501'. In an exemplary embodiment, a part of output terminals of the data driving IC DIC are connected to the first pad terminals 888a, respectively, through the output portion of the first connection unit 501', for example. Accordingly, the part of the output terminals of the data driving IC DIC are connected to the odd-numbered data lines DL1, DL3, DL5, . . . , DLj-5, DLj-3, and DLj-1 through the odd-numbered link lines 444a, respectively.

The data driving IC DIC is connected to the second pad terminals 888b through the first connection unit 501' and the second connection unit 502'. In an exemplary embodiment, another part of the output terminals of the data driving IC DIC are connected to the second pad terminals 888b, respectively, through the output portion of the first connection unit 501' and the output portion of the second connection unit 502', for example. Accordingly, the another part of the output terminals of the data driving IC DIC are connected to the even-numbered data lines DL2, DL4, DL6, . . . , DLj-4, DLj-2, and DLj through the even-numbered link lines 444b, respectively.

The data driving IC DIC provides image data signals to the data lines DL1 to DLj.

Figure 12:
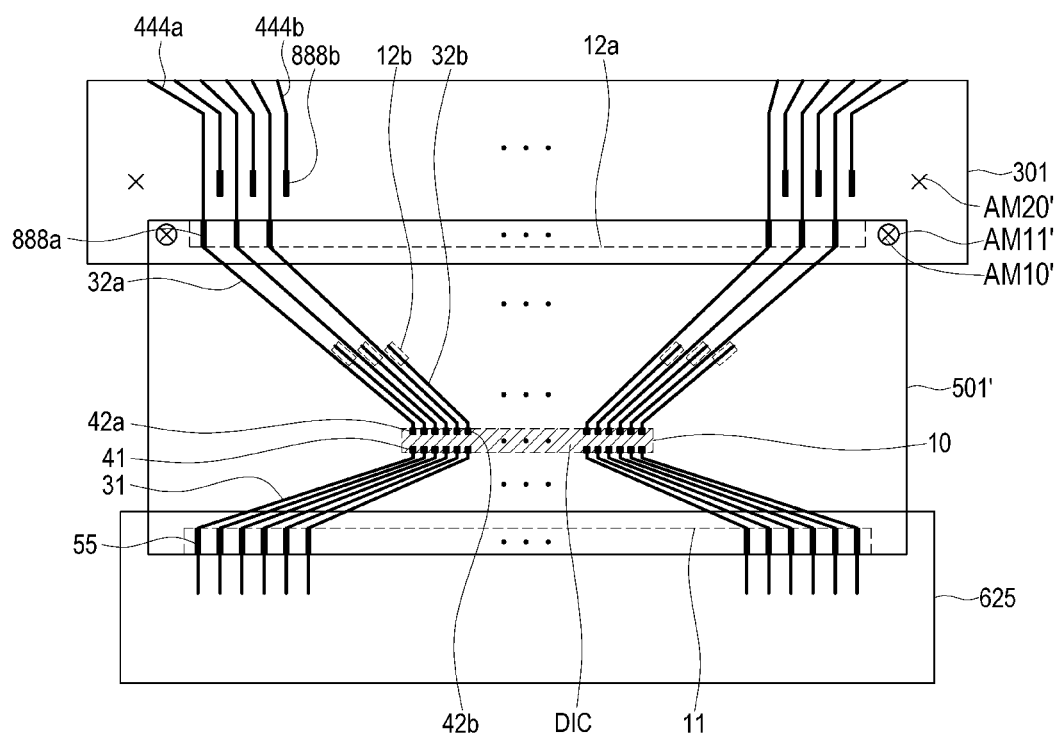
FIG. 12 is a plan view illustrating the first substrate, the first connection unit, and the PCB of FIG. 11.

FIG. 12 is a plan view illustrating the first substrate 301, the first connection unit 501', and the PCB 625 of FIG. 11.

As illustrated in FIG. 12, the first connection unit 501' includes a mounting portion 10, an input portion 11, an output portion 12a, an intermediate output portion 12b, a plurality of input lead lines 31, a plurality of output lead lines 32a and 32b, and a first connection alignment mark AM11'.

The data driving IC DIC is disposed (e.g., mounted) in the mounting portion 10. The mounting portion 10 and the intermediate output portion 12b are disposed between the input portion 11 and the output portion 12a.

The input portion 11 is connected to the PCB 625, the output portion 12a is connected to the first substrate 301, and the intermediate output portion 12b is connected to the second connection unit 502'.

The input lead lines 31 are connected to input terminals 41 of the data driving IC DIC, respectively. In addition, the input lead lines 31 are connected to pad terminals 55 of the PCB 625, respectively. In an exemplary embodiment, one end portion of the input lead line 31 is connected to the input terminal 41 of the data driving IC DIC, and another end portion of the input lead line 31 is connected to the pad terminal 55 of the PCB 625, for example.

One end portion of each input lead line 31 is exposed from the first connection unit 501' through the mounting portion 10, and another end portion of each input lead line 31 is exposed from the first connection unit 501' through the input portion 11.

The output lead lines 32a and 32b include first output lead lines 32a and second output lead lines 32b. The first output lead lines 32a are connected to some output terminals 42a of output terminals 42a and 42b of the data driving IC DIC, respectively. In an exemplary embodiment, the first output lead lines 32a of the first connection unit 501' may be odd-numbered output lead lines, and may be connected to the odd-numbered output terminals 42a of the data driving IC DIC, for example. In addition, as illustrated in FIG. 12, the first output lead lines 32a are connected to the first pad terminals 888a of the first substrate 301, respectively. In an exemplary embodiment, one end portion of the first output lead line 32a is connected to the odd-number output terminal 42a of the data driving IC DIC, and another end portion of the first output lead line 32a is connected to the first pad terminal 888a of the first substrate 301, for example.

The second output lead lines 32b are connected to another some output terminals 42b of the output terminals 42a and 42b of the data driving IC DIC, respectively. In an exemplary embodiment, the second output lead lines 32b of the first connection unit 501' may be even-numbered output lead lines, and may be connected to the even-numbered output terminals 42b of the data driving IC DIC, for example. In addition, the second output lead lines 32b are connected to the second connection unit 502'. In an exemplary embodiment, one end portion of the second output lead line 32b is connected to the even-number output terminal 42b of the data driving IC DIC, and another end portion of the second output lead line 32b is connected to the second connection unit 502', for example.

One end portion of each of the second output lead lines 32b is exposed from the first connection unit 501' through the mounting portion 10, and another end portion of each of the second output lead lines 32b is exposed from the first connection unit 501' through the intermediate output portion 12b.

The first connection unit 501' according to the embodiment of the invention is disposed on the first substrate 301 such that the first connection alignment mark AM11' of the first connection unit 501' and the first pad alignment mark AM10' on the first substrate 301 overlap each other. That is, the two first connection alignment marks AM11' are disposed overlapping the two first pad alignment marks AM10' that are spaced apart from each other with the output portion 12a interposed therebetween. The position of each of the first pad alignment mark AM10' and the first connection alignment mark AM11' may be set in advance such that the first pad terminals 888a on the first substrate 301 and the output portion 12a of the first connection unit 501' may be aligned with and electrically connected to each other.

Figure 13:
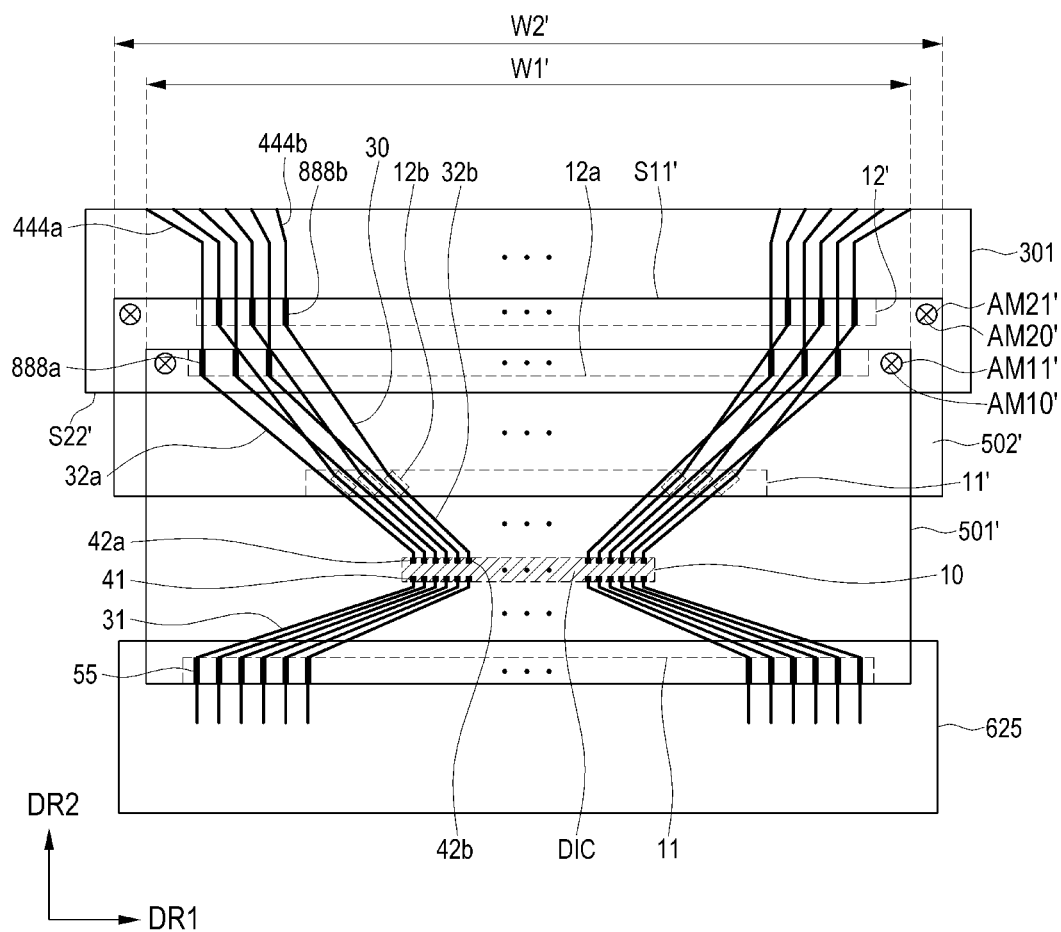
FIG. 13 is a plan view illustrating the first substrate, the first connection unit, the second connection unit, and the PCB of FIG. 11.

FIG. 13 is a plan view illustrating the first substrate 301, the first connection unit 501', the second connection unit 502', and the PCB 625 of FIG. 11.

As illustrated in FIG. 13, the second connection unit 502' includes an input portion 11', an output portion 12', a plurality of lead lines 30, and a second connection alignment mark AM21'.

The input portion 11' is connected to the first connection unit 501', and the output portion 12' is connected to the first substrate 301.

The lead lines 30 are connected to the second output lead lines 32b of the first connection unit 501', respectively. In addition, the lead lines 30 are connected to the second pad terminals 888b of the first substrate 301, respectively. In an exemplary embodiment, one end portion of the lead line 30 is connected to the intermediate output portion 12b of the first connection unit 501', and another end portion of the lead line 30 is connected to the second pad terminal 888b of the first substrate 301, for example.

One end portion of each lead line 30 is exposed from the second connection unit 502' through the input portion 11', and another end portion of each lead line 30 is exposed from the second connection unit 502' through the output portion 12'.

At least one of the first output lead lines 32a of the first connection unit 501' intersects at least one of the lead lines 30 of the second connection unit 502'. The input lead lines 31 of the first connection unit 501' do not intersect the lead lines 30 of the second connection unit 502'. In addition, the output portion 12a of the first connection unit 501' is disposed in a plan view between one side S11' (hereinafter, "a first side") of the second connection unit 502' and one side S22' (hereinafter, "a second side") of the first substrate 301. The first side S11' is one of sides of the second connection unit 502' that overlaps the first substrate 301 and does not intersect an edge of the first substrate 301, and the second side S22' is one of sides of the first substrate 301 that overlaps the first connection unit 501' and the second connection unit 502'.

In an exemplary embodiment, as illustrated in FIG. 13, the second connection unit 502' according to the embodiment of the invention has a maximum width larger than that of the first connection unit 501'. More specifically, when the maximum width in the row direction DR1 of the first connection unit 501' is defined as a first width W1' and the maximum width in the row direction DR1 of the second connection unit 502' is defined as a second width W2', the second width W2' is larger than the first width W1'.

In addition, an interval between the two second pad alignment marks AM20' is larger than an interval between the two first pad alignment marks AM10'. Similarly, an interval between the two second connection alignment marks AM21' is larger than an interval between the two first connection alignment marks AM11'. In particular, the two second pad alignment marks AM20' and the two second connection alignment marks AM21' do not overlap the first connection unit 501' in the column direction DR2 in a plan view. Accordingly, a more precise alignment process may be performed, and defects due to misalignment between the first substrate 301 and the first and second connection units 501' and 502' may be substantially minimized, which will be described in detail below.

Figure 14:
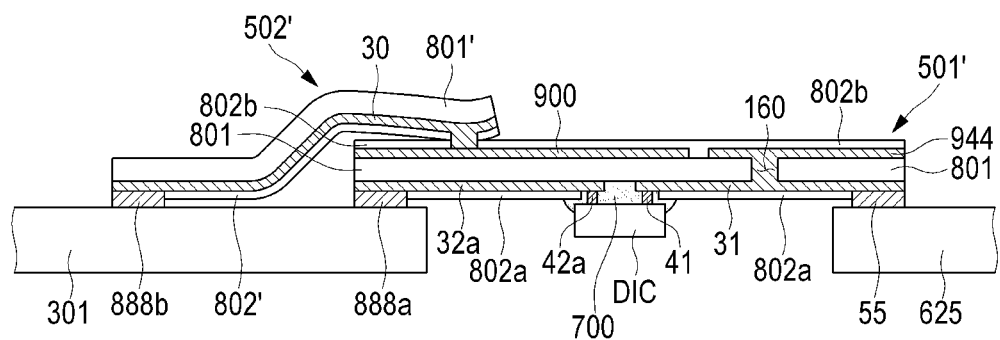
FIG. 14 is a cross-sectional view illustrating the display device of FIG. 11 when viewed in the direction of the arrow.

FIG. 14 is a cross-sectional view illustrating the display device of FIG. 11 when viewed in the direction of the arrow. In an exemplary embodiment, the data lines and the link lines 444a and 444b connected to the pad terminals 888a and 888b are not illustrated in FIG. 14 for the convenience of explanation.

As illustrated in FIG. 14, the first connection unit 501' includes a base layer 801, an input lead line 31, an auxiliary input lead line 944, a first output lead line 32a, an auxiliary output lead line 900, a first cover layer 802a, and a second cover layer 802b.

The input lead line 31 is located between the first cover layer 802a and the base layer 801.

In an exemplary embodiment, the base layer 801 may include polyimide, for example.

In an exemplary embodiment, the first cover layer 802a may be a solder resist, for example.

One end portion of the input lead line 31 is connected to the input terminal 41 of the data driving IC DIC through the mounting portion 10 (refer to FIG. 13) of the first cover layer 802a, and another end portion of the input lead line 31 is connected to the pad terminal 55 of the PCB 625 through the input portion 11 (refer to FIG. 13) of the first cover layer 802a. The input lead line 31 may be connected to the auxiliary input lead line 944 through a contact hole 160 of the base layer 801.

The auxiliary input lead line 944 is located between the second cover layer 802b and the base layer 801.

In an exemplary embodiment, the second cover layer 802b may be a solder resist, for example.

The first output lead line 32a is located between the base layer 801 and the first cover layer 802a.

One end portion of the first output lead line 32a is connected to the first output terminal 42a of the data driving IC DIC through the mounting portion 10 (refer to FIG. 13) of the first cover layer 802a, and another end portion of the first output lead line 32a is connected to the first pad terminal 888a of the first substrate 301 through the output portion 12a (refer to FIG. 13) of the first cover layer 802a.

Although not illustrated, one end portion of the second output lead line 32b (refer to FIG. 13) is connected to the even-numbered output terminal 42b (refer to FIG. 13) of the data driving IC DIC through the mounting portion 10 (refer to FIG. 13) of the first cover layer 802a, and another end portion of the second output lead line 32b is connected to the auxiliary output lead line 900 through another contact hole of the base layer 801.

The auxiliary output lead line 900 is located between the base layer 801 and the second cover layer 802b. The auxiliary output lead line 900 is connected to the lead line 30 of the second connection unit 502' through the intermediate output portion 12b (refer to FIG. 13) of the second cover layer 802b.

The data driving IC DIC may be attached to the first connection unit 501' through an adhesive member 700.

As illustrated in FIG. 14, the second connection unit 502' includes a base layer 801', a lead line 30, and a cover layer 802'.

The lead line 30 is located between the base layer 801' and the cover layer 802'.

One end portion of the lead line 30 is connected to the auxiliary output lead line 900 of the first connection unit 501' through the input portion 11' (refer to FIG. 13) of the cover layer 802' and the intermediate output portion 12b (refer to FIG. 13) of the cover layer 802'.

Another end portion of the lead line 30 is connected to the second pad terminal 888b of the first substrate 301 through the output portion 12' (refer to FIG. 13) of the cover layer 802'.

In an exemplary embodiment, the first connection unit 501' and the second connection unit 502' may be attached to the first substrate 301 at a time by a single bonding process.

As such, the first connection unit 501' according to the embodiment of the invention is connected to the first pad terminals 888a of the first substrate 301, and the second connection unit 502' is connected to the second pad terminals 888b. That is, the first connection unit 501' and the second connection unit 502' are a single-layer type connection unit, each selectively connected to pad terminals of only one column.

Since the display device according to the embodiment of the invention has a connection structure in which the single-layer type connection units 501' and 502' are superimposed, the manufacturing cost of the display device may be reduced, and the crack defect rate of the connection unit may be remarkably reduced.

As set forth hereinabove, the display device according to one or more exemplary embodiments includes first and second connection units having different widths, and thus the defect rate may be substantially minimized, and the manufacturing costs may be reduced.

While the invention has been illustrated and described with reference to the exemplary embodiments thereof, it will be apparent to those of ordinary skill in the art that various changes in form and detail may be made thereto without departing from the spirit and scope of the invention.

What is claimed is:
1. A display device comprising:
a substrate including a display area and a non-display area;
a first pad terminal and a second pad terminal disposed in the non-display area of the substrate, the first pad terminal arranged along a first column and the second pad terminal arranged along a second column;
a first connection unit connected to the first pad terminal;
a first driving integrated circuit connected to the first connection unit;

a second connection unit connected to the second pad terminal and overlapping the first connection unit; and
a second driving integrated circuit connected to the second connection unit,
wherein a maximum width of the second connection unit in a row direction is larger than a maximum width of the first connection unit in the row direction,
wherein a first length of one side in the row direction of the second connection unit is different from a second length of the other side opposite to the one side,
wherein a third length of one side in a column direction of the second connection unit is different from a fourth length of the other side facing the one side, and
wherein the first length of the second connecting unit connected to the substrate is greater than the second length of the second connecting unit connected to a printed circuit board.

2. The display device of claim 1, further comprising:
a first pad alignment mark disposed in the non-display area of the substrate and close to the first pad terminal; and
a second pad alignment mark disposed in the non-display area of the substrate and close to the second pad terminal.

3. The display device of claim 2, wherein the second pad alignment mark does not overlap the first connection unit in a column direction.

4. The display device of claim 2, wherein the first pad alignment mark comprises two first pad alignment marks spaced apart from each other with the first pad terminal therebetween, and
the second pad alignment mark comprises two second pad alignment marks spaced apart from each other with the second pad terminal therebetween.

5. The display device of claim 4, wherein an interval between the two second pad alignment marks is larger than an interval between the two first pad alignment marks.

6. The display device of claim 2, further comprising:
a first connection alignment mark disposed at the first connection unit and overlapping the first pad alignment mark; and
a second connection alignment mark disposed at the second connection unit and overlapping the second pad alignment mark.

7. The display device of claim 2, wherein the second connection unit overlaps the first pad terminal and the first pad alignment mark, and
the first connection unit does not overlap the second pad terminal and the second pad alignment mark.

8. The display device of claim 1, wherein at least a part of the first connection unit is disposed between the substrate and the second connection unit.

9. The display device of claim 1, wherein the printed circuit board is connected to the first connection unit and the second connection unit.

10. The display device of claim 9, wherein the first connection unit comprises:
an output lead line connected to the first pad terminal and the first driving integrated circuit; and
an input lead line connected to the first driving integrated circuit and the printed circuit board.

11. The display device of claim 10, wherein the second connection unit comprises:
an output lead line connected to the second pad terminal and the second driving integrated circuit; and
an input lead line connected to the second driving integrated circuit and the printed circuit board.

12. The display device of claim 11, wherein the output lead line of the first connection unit intersects the output lead line of the second connection unit, and
the input lead line of the first connection unit does not intersect the input lead line of the second connection unit.

13. The display device of claim 9, wherein one side of the first connection unit overlaps the substrate and does not intersect an edge of the substrate,
another side of the first connection unit which opposes the one side of the first connection unit overlaps the printed circuit board and does not intersect an edge of the printed circuit board, and
a length of the one side of the first connection unit is larger than a length of the another side of the first connection unit.

14. The display device of claim 13, wherein one side of the second connection unit overlaps the substrate and does not intersect an edge of the substrate,
another side of the second connection unit which opposes the one side of the second connection unit overlaps the printed circuit board and does not intersect an edge of the printed circuit board, and
a length of the one side of the second connection unit is larger than a length of the another side of the second connection unit.

15. The display device of claim 14, wherein the length of the one side of the second connection unit is larger than the length of the one side of the first connection unit.

16. A display device comprising:
a substrate including a display area and a non-display area;
a first pad terminal and a second pad terminal disposed in the non-display area of the substrate, the first pad terminal arranged along a first column and the second pad terminal arranged along a second column;
a first connection unit connected to the first pad terminal;
a driving integrated circuit disposed at the first connection unit; and
a second connection unit connected to the second pad terminal and the first connection unit and overlapping the first connection unit,
wherein a maximum width of the second connection unit in a row direction is larger than a maximum width of the first connection unit in the row direction,
wherein a first length of one side in the row direction of the second connection unit is different from a second length of the other side opposite to the one side,
wherein a third length of one side in a column direction of the second connection unit is different from a fourth length of the other side facing the one side, and
wherein the first length of the second connection unit connected to the substrate is greater than the second length of the second connecting unit connected to a printed circuit board.

17. The display device of claim 16, further comprising:
a first pad alignment mark disposed in the non-display area of the substrate and close to the first pad terminal; and
a second pad alignment mark disposed in the non-display area of the substrate and close to the second pad terminal.

18. The display device of claim 17, wherein the second pad alignment mark does not overlap the first connection unit in a column direction.

19. The display device of claim 17, wherein the first pad alignment mark comprises two first pad alignment marks spaced apart from each other with the first pad terminal therebetween, and the second pad alignment mark comprises two second pad alignment marks spaced apart from each other with the second pad terminal therebetween.

20. The display device of claim 19, wherein an interval between the two second pad alignment marks is larger than an interval between the two first pad alignment marks.

21. The display device of claim 17, further comprising:
a first connection alignment mark disposed at the first connection unit and overlapping the first pad alignment mark; and
a second connection alignment mark disposed at the second connection unit and overlapping the second pad alignment mark.

22. The display device of claim 17, wherein the second connection unit overlaps the first pad terminal and the first pad alignment mark, and the first connection unit does not overlap the second pad terminal and the second pad alignment mark.

23. The display device of claim 16, wherein at least a part of the first connection unit is disposed between the substrate and the second connection unit.

24. The display device of claim 16, wherein the printed circuit board is connected to the first connection unit.

25. The display device of claim 24, wherein the first connection unit comprises:
a first output lead line connected to the first pad terminal and the driving integrated circuit;
a second output lead connected to the driving integrated circuit and the second connection unit; and
an input lead line connected to the driving integrated circuit and the printed circuit board.

26. The display device of claim 25, wherein the second connection unit comprises a lead line connected to the second pad terminal and one of the driving integrated circuit and the second output lead line.

* * * * *